United States Patent [19]

Soulsby et al.

[11] 4,078,259
[45] Mar. 7, 1978

[54] PROGRAMMABLE CONTROLLER HAVING A SYSTEM FOR MONITORING THE LOGIC CONDITIONS AT EXTERNAL LOCATIONS

[75] Inventors: Donald R. Soulsby, Davenport; William H. Seipp, Bettendorf, both of Iowa

[73] Assignee: Gulf & Western Industries, Inc., New York, N.Y.

[21] Appl. No.: 727,957

[22] Filed: Sep. 29, 1976

[51] Int. Cl.² ............ G05B 11/01; G05B 19/02; G06F 9/06
[52] U.S. Cl. .................................................. 364/900
[58] Field of Search ...................... 235/151.1, 151.11

[56] References Cited
U.S. PATENT DOCUMENTS

| 3,827,030 | 7/1974 | Seipp | 364/900 |
| 3,974,484 | 8/1976 | Struger et al. | 364/900 |
| 3,978,454 | 8/1976 | Willard | 364/900 |
| 3,997,879 | 12/1976 | Markley et al. | 364/900 |

Primary Examiner—Melvin B. Chapnick
Attorney, Agent, or Firm—Meyer, Tilberry & Body

[57] ABSTRACT

A system for monitoring the logic conditions at the external addressable locations of a programmable controller wherein intermediate memory units are provided for controlling separate input and output locations. The controller periodically sequences the data in the intermediate memory units to maintain the logic conditions in the input and output locations. If the logic conditions are to be updated, the controller obtains access to the sequencing arrangement and changes the logic conditions within the intermediate memory units. Thereafter, the sequencing continues to maintain the desired logic conditions in the input and output locations.

18 Claims, 9 Drawing Figures

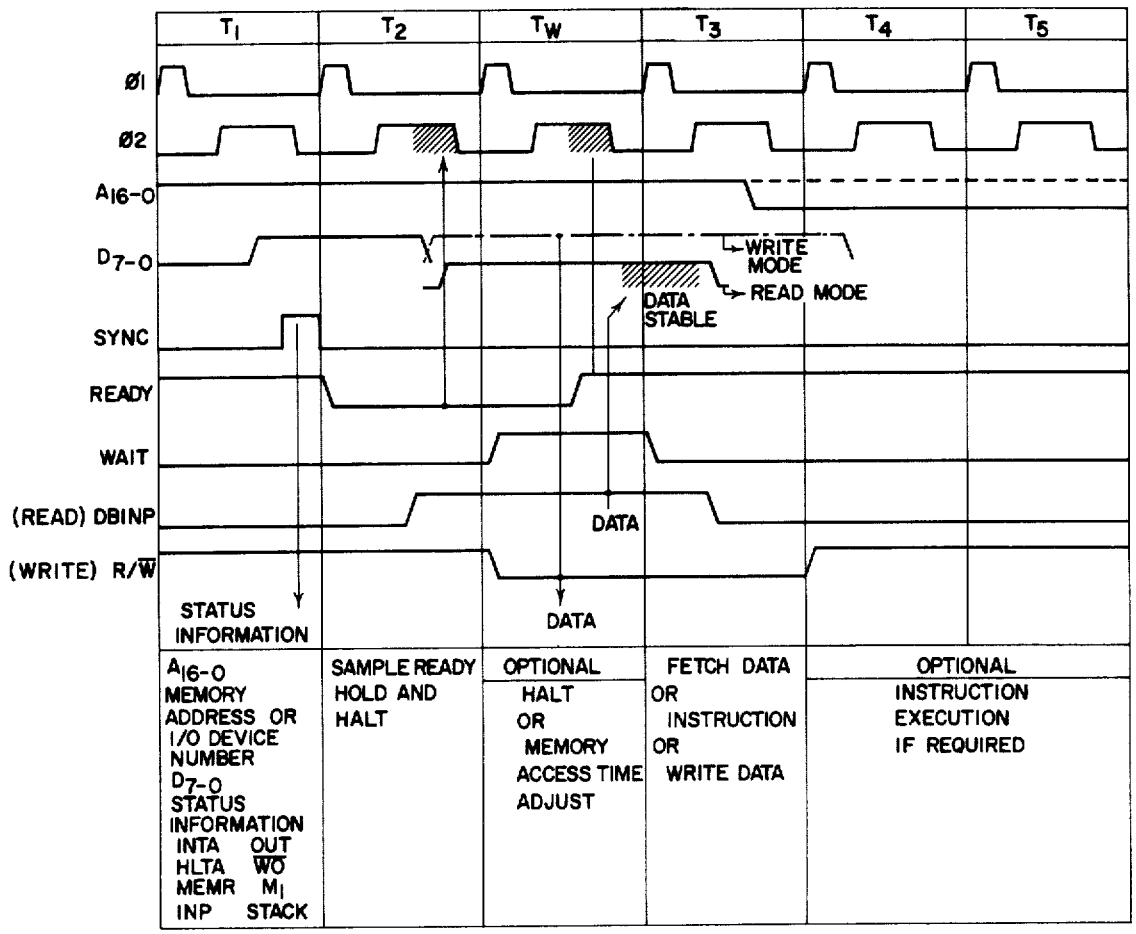

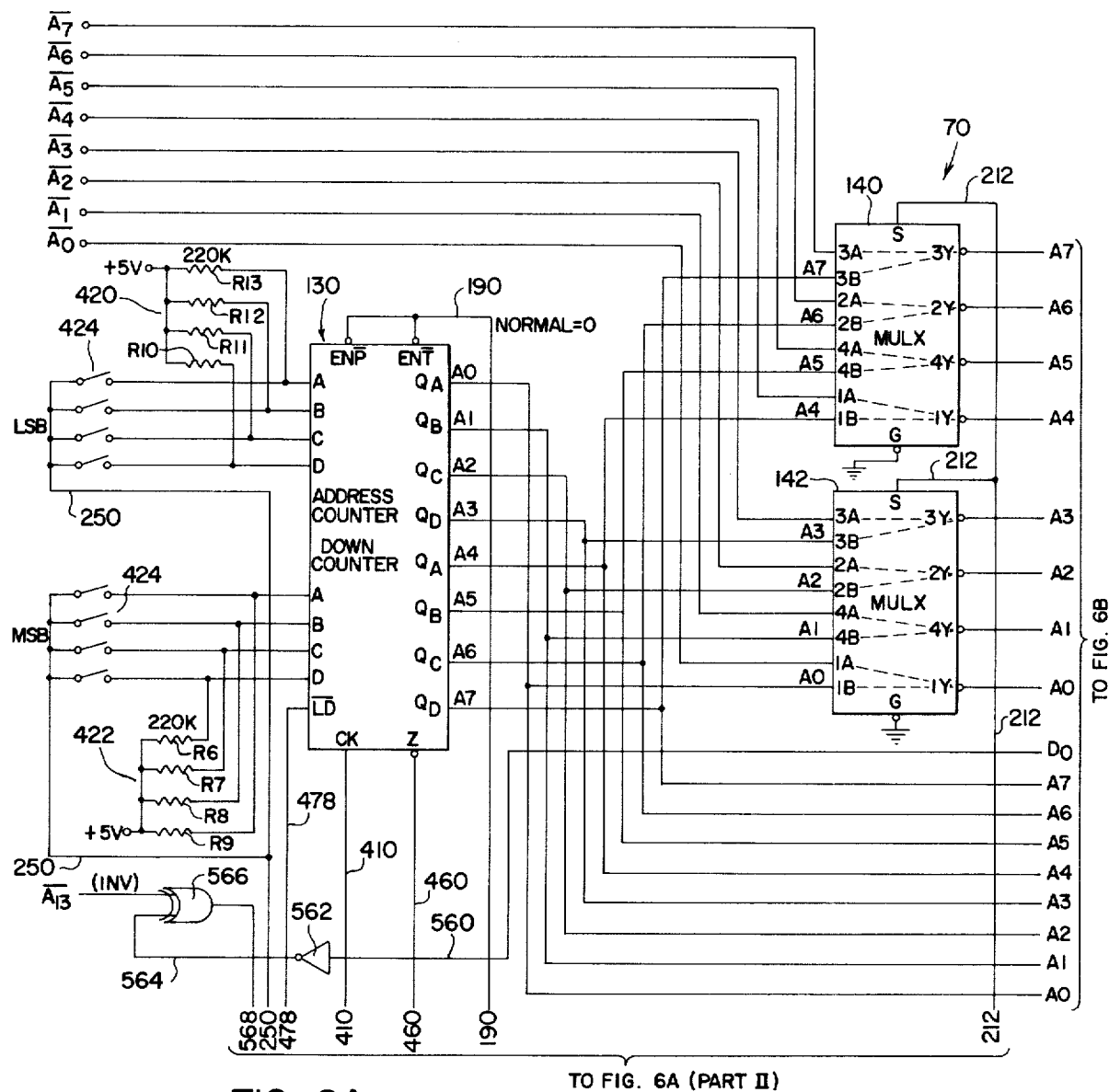
FIG. 6A (PART I)

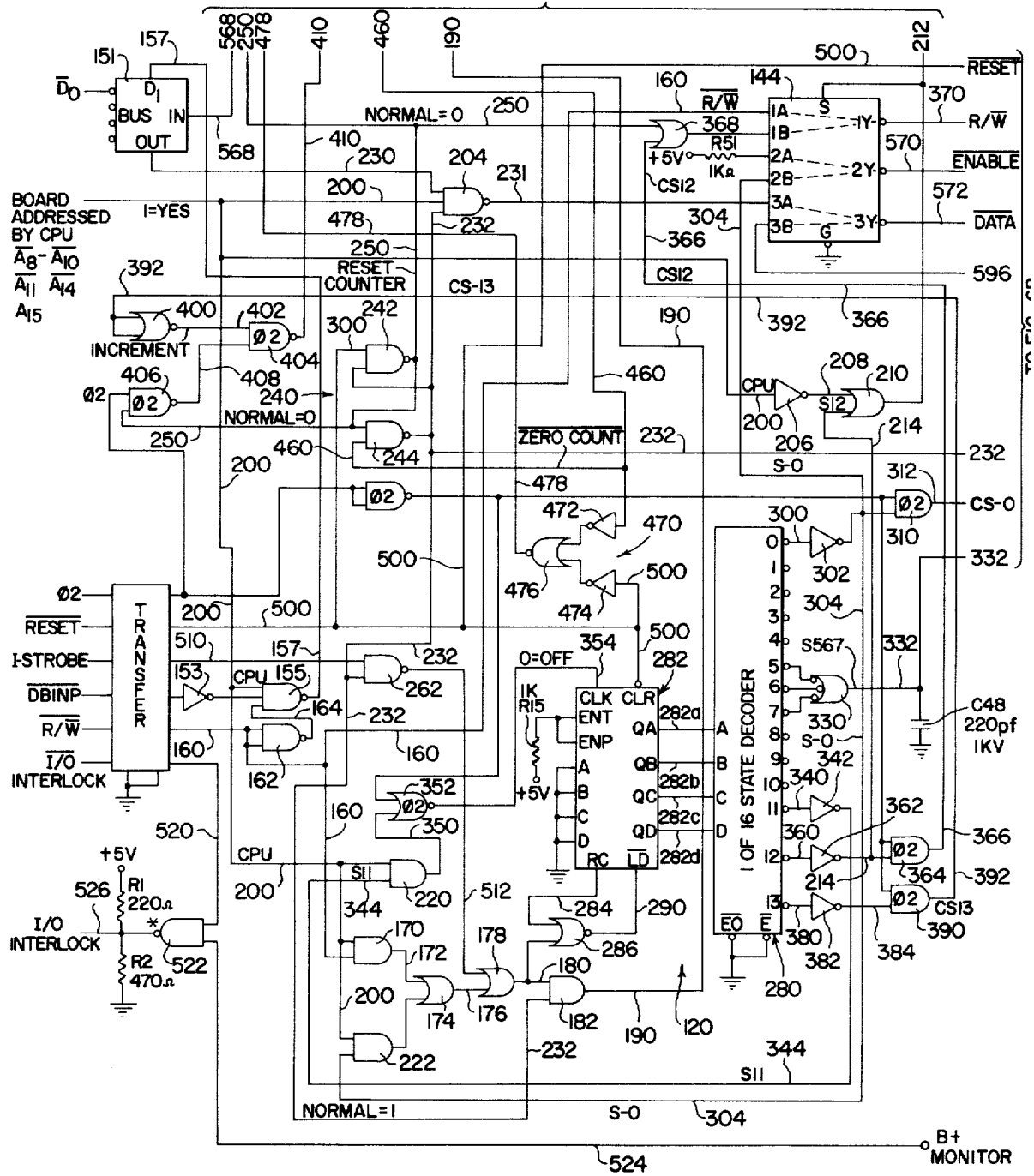
FIG. 6A (PART II)

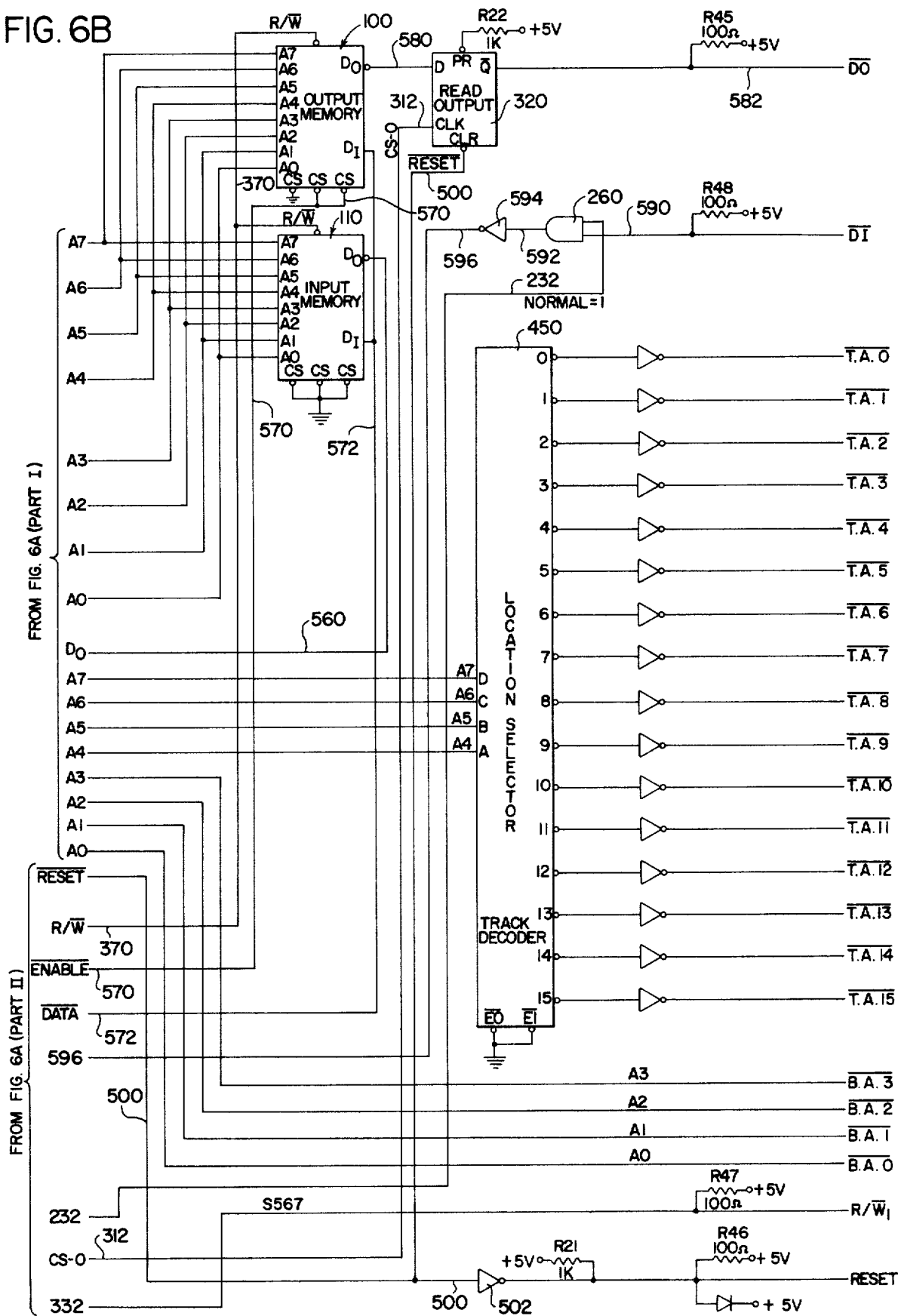

PROGRAMMABLE CONTROLLER HAVING A SYSTEM FOR MONITORING THE LOGIC CONDITIONS AT EXTERNAL LOCATIONS

The present invention relates to the art of programmable controllers of the type having a central processing unit and external addressable terminals or locations serving as input or output units; and, more particularly, to a system for monitoring the logic conditions at such external addressable locations. The present invention is particularly applicable for use with a programmable controller of the type having a microprocessor as the central processing unit, and it will be described with particular reference thereto; however, it is appreciated that the invention has somewhat broader applications and may be used in various programmable controllers.

INCORPORATION BY REFERENCE

Prior application Ser. No. 701,858, filed July 1, 1976, is incorporated by reference for background information. This prior application relates to a programmable controller using a microprocessor as the central processing unit and incorporating several modules some of which control the input and output of information to and from the programmable controller.

BACKGROUND OF INVENTION

In recent years, several companies have developed and are marketing microprocessors of the type employing a number of address lines, bi-directional data lines, and certain command signal lines. There has been a substantial amount of effort devoted to the concept of incorporating this type of miniaturized device into a total programmable controller system. In such a system, a number of external locations are employed to input information to the programmable controller and to output information from the programmable controller. These external locations are often single bit data locations, which are addressable by an appropriate address appearing on the address lines of the programmable controller. In some systems, the various external locations are designated as either input locations or output locations. Thus, certain external locations can be used only for a given type of function. In the application incorporated by reference herein, various external locations are single bit data locations which can be either input, output or data storage locations. In this manner, a single group of external locations can be connected with selected combinations of input or output functions. This concept substantially simplifies the operation of the programmable controller and causes a corresponding reduction in price and increase in versatility. In many programmable controllers, the central processing unit must be able to update the various external locations and read the existing conditions from various external locations. To do this, an appropriate address corresponding to the external location is directed to the address lines, which address selects the particular external location and either input data from the location, on a READ command, or places data in the external locations on a WRITE command. These programmed commands appear on the terminals available in any of various standard microprocessors which can be used as a central processing unit of a programmable controller system. Such systems require complicated circuitry for holding the logic at various external locations and for reading from these external locations. One of the difficulties is that the programmable controller operates at a relatively high speed and some of the external locations can not function as rapidly as desired. In addition, if the locations are spaced substantially from the system, the communication time between the various external locations can greatly exceed the normal machine cycle time of the programmable controller. Thus, the programmable controller must wait for external communications. As an alternative, the spacing of various external locations is limited according to the communication time required in relationship to the operating time of the programmable controller. Some programmable controllers operate directly upon the external locations during a READ or WRITE command. This again presents processing time problems and increases the complexity of circuitry used to communicate between external locations and the central processing unit. In some systems, it has been suggested that the controller read and update the external locations during each program cycle. This requires substantial program space and increases the execution time for each program process cycle.

All of these disadvantages have been overcome by the present invention which relates to a system for monitoring logic conditions at external addressable locations having known addresses in a programmable controller of the type including address lines, at least one bi-directional data line, a WRITE line for receiving a programmed WRITE signal and a READ line for receiving a programmed READ signal.

In accordance with the present invention, a system as described above, includes an output memory unit having a memory location for each external location; an input memory unit having a memory location for each external location; means for writing data from the data line into one of the memory locations of each of the memory units upon creation of a selected one of the known addresses on the address lines and a programmed WRITE signal; means for reading data from a memory location in the input memory unit upon creation of a selected one of the known addresses on the address lines and a programmed READ signal; means for generating the known addresses on auxiliary lines in series and independent of the address lines, means for generating a hardwired WRITE signal independent of the programmed WRITE signal and concurrent with a generated known address; means for generating a hardwired READ signal independent of the programmed READ signal and concurrent with a generated known address; means responsive to one of the hardwired signals for directing data from the output memory unit to one of the external locations addressed by the corresponding generated address; and, means responsive to the other of the hardwired signals for directing data corresponding to the logic condition of one of the external locations to the input memory unit.

By providing the intermediate input and output memory units, which could be combined as a single unit, the memory units themselves are used for storing the logic conditions of external addressable locations. The CPU of the programmable controller can then communicate with the intermediate memory units to either update the external addressable locations or receive information corresponding to their intended logic conditions. Thus, the intermediate memory units form the communication between the programmable controller and the external addressable locations. In this manner, the input and output circuitry can be operated independent of the CPU of the programmable controller. The intermediate memory units store new data for the external locations, which are then updated.

In accordance with another aspect of the present invention, there is provided a scanning circuit for continuously scanning fictitiously created addresses corresponding to the addresses of the external locations. This scanning operation and creation of fictitious addresses is independent of the CPU system and allows updating of the external locations according to the current condition of the intermediate memory units. When the CPU creates a command to change an external condition, the scanning circuit is disabled and the intermediate memory reads an address from the CPU and updates the location at the memory address. Thereafter, the scanning circuit continues and ultimately shifts this new data, at its convenience, to the proper external location. As external conditions change, such as the closing of a switch forming an input location, the scanning circuit changes the data at the intermediate memory location when a fictitiously created address corresponds to the external input location. Thereafter, when the CPU reads the external locations, this modified information or data is available at the intermediate memory for use by the CPU controlled section of the programmable controller.

The primary object of the present invention is the provision of a system for monitoring the logic conditions at external addressable locations in a programmable controller, which system can be incorporated into a programmable controller to isolate CPU processing from external location processing.

Another object of the present invention is the provision of a system, as defined above, which system can be incorporated into a programmable controller, without modifying the basic features of the programmable controller.

Another object of the present invention is the provision of a system, as defined above, which system allows use of extremely remote external locations without affecting the timing used in processing information by the CPU of the programmable controller.

Another object of the present invention is the provision of a system, as defined above, which system allows external locations to be used as either inputs, outputs or memory locations for the programmable controller.

Another object of the present invention is the provision of a system, as defined above, which system incorporates a scanning circuit for updating external locations with fictitiously created addresses and interruptable by the CPU of the programmable controller for access to information indicative of the conditions of the external locations.

Still another object of the present invention is the provision of a system, as defined above, which system does not require communication with the external locations by the central processing unit or communication during each program cycle.

These and other objects and advantages will become apparent from the following description taken together with the accompanying drawings.

BRIEF DESCRIPTION OF DRAWINGS

In the present disclosure, the drawings include the following views.

FIG. 2 is a standard status chart for an Intel 8080 programmable controller as contemplated for use in the general system illustrated in FIG. 1;

FIG. 3 is a standard timing chart for an Intel 8080 programmable controller of the type used in the illustrated embodiment shown in FIG. 1;

FIG. 6 which is made up of FIGS. 6A (including Part I and Part II), 6B is a wiring diagram showing, somewhat schematically, the preferred embodiment of the present invention; and, FIG. 7 is a block diagram illustrating certain logic transfer concepts employed in the preferred embodiment as illustrated in FIGS. 4 and 6.

GENERAL CONTROLLER SYSTEM

Figure 1:
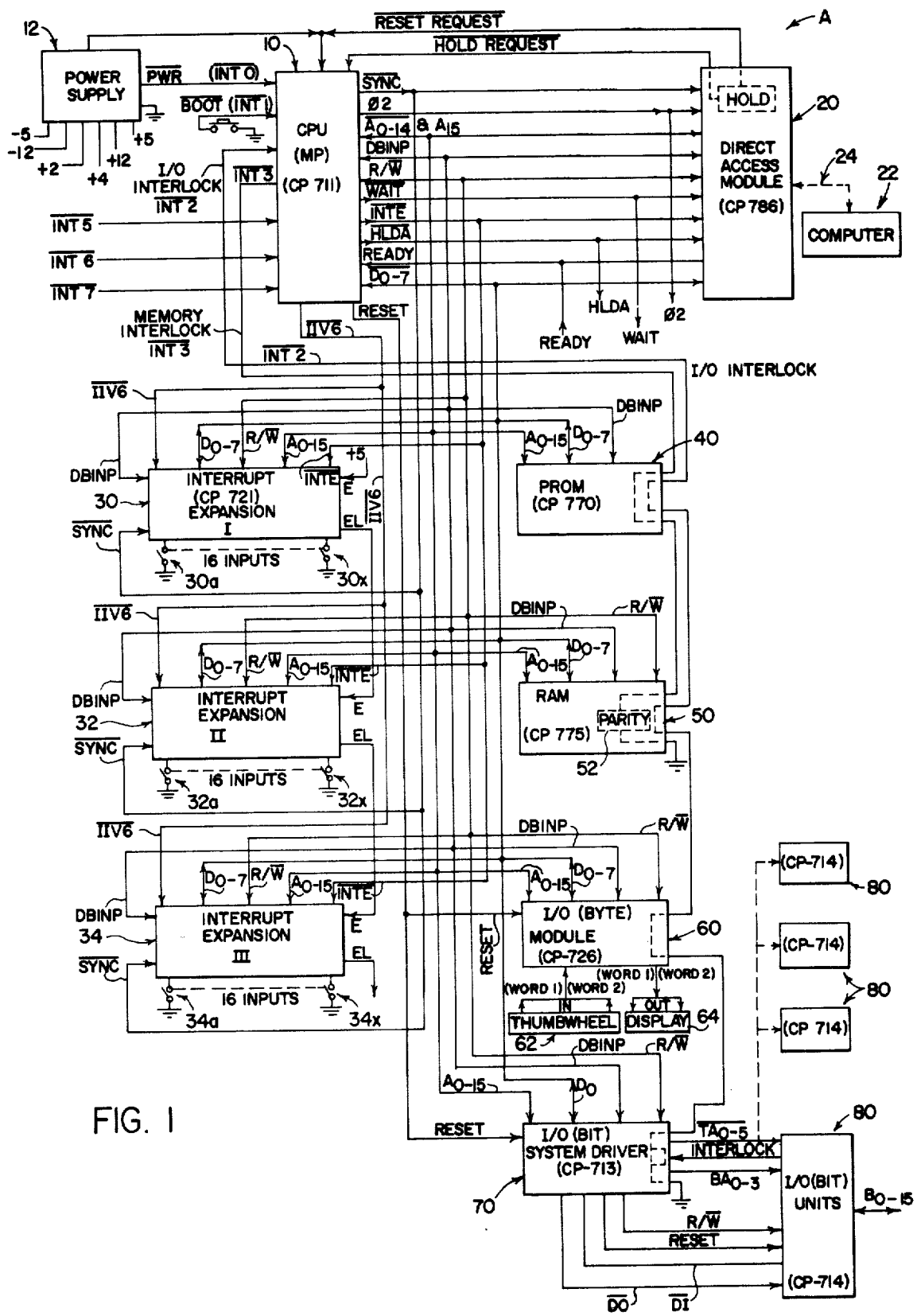
FIG. 1 is a schematic block diagram illustrating a programmable controller using a microprocessor and for which the present invention is particularly adapted for use.

Referring now to FIGS. 1, 2 and 3 wherein the showings are for the purpose of illustrating a programmable controller A for controlling machines, processes and other systems in response to input information from inputs and existing conditions or other parameters. This controller system uses the module and method of the present invention. The inputs, conditions and parameters are directed to the controller A from various external terminals and locations which are capable of providing binary information as single bit or multiple bits, i.e. bytes. These external terminals may be switches, decoded thumbwheels, lights, decoded analog data and binary coded conditions. In accordance with normal practice the controller includes memory locations and is processed in accordance with a program stored as a plurality of steps or instructions in such system memory. Certain random access memories are provided for storing intermediate information or data. This memory can also be used for some program storage although a program read only memory is generally used for storage of the program information or steps.

As illustrated in FIG. 1, programmable controller A is a digital processing system including a plurality of separate and distinct plug-in modules interconnected by a plurality of control lines, which are generally in a motherboard connecting system, except for remote input/output modules. The basic modules and control lines therefore are schematically illustrated in FIG. 1 wherein a central processing unit module (CPU) 10 or module CP711 employs a standard microprocessor as its central control unit. This microprocessor is a known MOS integrated circuit chip which includes internal registers, counters, pointers and associated logic circuitry well known in the art. The microprocessor has a number of output address terminals, a number of bi-directional data terminals, means for setting the chip into various known states and means for providing a status code on the data lines at the start of each separate command. Although a variety of microprocessors having these standard capabilities could be used, the embodiment illustrated in FIGS. 1, 2 and 3 involves the use of an Intel 8080 microprocessor which has sixteen address terminals and eight bi-directional data terminals.

The controller A incorporates the various concepts relating to the use of a microprocessor for processing input and output information to control a preprogrammed series of events of a machine, process, etc. The input information in the illustrated embodiment is digital information both at the input and output; however, converters for conversion between analog and digital could be used to interface between the system shown in FIG. 1 and various analog inputs and/or outputs. The CPU module 10 is communicated with the other modules to process input and output information on lines $D_0$-$D_7$. A brief description of the separate modules will be sufficient to illustrate their intended use with the CPU module 10 and the overall operation of programmable controller A.

To initially program and debug the controller A, there is provided a direct access module 20 which takes over control of several control lines connected to CPU module 10. Thus, it is possible to directly program the memories in controller or system A by an external device, such as a schematically represented digital computer 22. In the illustrated embodiment, the computer is connected to direct access module 20 by schematically represented lines 24. When a HOLD REQUEST signal is directed from module 20 to CPU module 10, computer 22, or other external control devices, obtains control over the address lines, the input designation line DBINP, the READ/WRITE line, and the $D_0$-$D_7$ data lines, and other lines shown by the arrows in FIG. 1. When this happens, the CPU module is essentially disconnected from the rest of the controller and computer 22 can load memories, i.e. to program the controller, and actually operate the controller, as in debugging and troubleshooting. The direct access module is used to load all memories of system A with the desired logic, set inputs and outputs to the desired conditions, selectively read the contents of the memory or the various input and output circuits, reset controller A, provide intermediate stop and run operations for the controller A, and check the status of all the memory positions and registers of controller A including the registers of the microprocessor MP in CPU module 10. The direct access module is used for flow of data to and from system A under the control of an external unit such as a computer, external tape reading devices, Teletype, etc.

In order to accomplish transfer of control to module 20, microprocessor MP of module 10 is placed into the HOLD state, which will be explained later. The external programmer, such as a computer or tape reader, sends data to and from a controller A through data lines $D_0$-$D_7$ and the location of the data is controlled by address lines $A_0$-$A_{15}$. By placing the microprocessor of module 10 in the HOLD condition or state, instead of the HALT state, the functions of the microprocessor can be taken over by a programmed signal or request from module 20. Also, control by the microprocessor can be reestablished by a simple command without complex programming required when the microprocessor shifts to a HALT state. It is not necessary to provide an initiation pulse for again obtaining control over system A by module 10. As soon as the HOLD condition is released, the CPU module 10 again assumes control over the lines illustrated in FIG. 1. This provides a convenient manner for giving direct access to the controller A for programming and debugging and then for releasing the controller for control, which is isolated from module 20.

CPU module 10 may be interrupted by external conditions to interrupt the program and shift control over the microprocessor to a memory stored subroutine. This is a standard INTERRUPT feature of most eight bit microprocessors; however, controller A includes a plurality of separate interrupt expansion modules, three of which are schematically illustrated as interrupt expansion modules I, II, III, or 30, 32 and 34, respectively. The difference between the first expansion module and subsequent expansion modules is that the enabled terminal E of module 30 is tied to a logic 1, which in practice is five volts throughout controller or system A. The subsequent modules 32, 34, and any additional modules, include an input enable logic at terminal E which is controlled by the condition of preceding interrupt expansion modules. This connection arrangement provides a priority level system wherein the interrupt inputs of module 30 have a priority over the interrupt inputs of subsequent interconnected expansion modules 32, 34, etc. In each of the interrupt expansion modules, in the illustrated embodiment, there are provided sixteen separate interrupt inputs which are schematically illustrated as a plurality of single pole, grounded switches 30a-30x, 32a-32x and 34a-34x. These interrupt inputs can be logic inputs which contain information requesting a shift of module 10 into the interrupt state for processing of a selected subroutine. Thus, actuation of an input will cause the microprocessor MP of module 10 to interrupt and shift into the subroutine which is to be processed. Then control is returned to the executive program of controller or system A. By using this interrupt expansion arrangement, a great number of selectable subroutines can be provided and called by providing an interrupt request at one of the several schematically represented logic inputs. The executive program of system A requires the processing of a "look" command or sequence for those data or logic inputs and outputs under interrupt control only when an interrupt request is received indicating that a certain terminal or terminals should be scanned and/or updated.

When an interrupt request is received by the CPU module from a terminal or an expansion module, the microprocessor shifts to an interrupt state and data from the expansion module selects or "calls" a given subroutine by an address on lines $D_0$-$D_7$. Then the calling input or output will be processed according to the desired and requested interrupt subroutine. Thereafter the subroutine will shift command back to the main program. If there is no interrupt request, then the executive program is processed repeatedly without processing the interrupt subroutines. Consequently, the subroutines are called and processed only when needed. The number of expansion terminals of modules 30-34 can be increased to larger values. The only practical limitations are the memory capacity which can be expanded to various capacities and the time available for processing interrupt subroutines.

By providing the interrupt expansion modules, the microprocessor of system or controller A can be interrupted a substantially greater number of times than is available on known microprocessors. Thus, the normal microprocessor interrupt concept of priority evaluation and jumping to a subroutine called by a particular interrupt can be used for many separate inputs or conditions. This saves programming time and allows the use of subroutines which may be stored into the memories of system A for only periodic use. The versatility of system A is thereby greatly expanded while still using a readily available, relatively inexpensive microprocessor.

Module 40 is a programmable read only memory (PROM) module. This PROM module is used in system A for the purpose of retaining permanent logic at various addressed locations determined by the logic on lines $A_0-A_{15}$. In practice, the executive program and the various subroutines are generally, permanently stored at various addressed locations within PROM module 40. This memory module is used for long term or permanent storage of the program and employs MOS memory chips that are erasable upon exposure to ultraviolet light and are programmable by means, such as computer 22 or a tape reading device through direct access module 20. In practice, the PROM module has a capacity of 4,096 eight bit words. The number of words available in the read only memory module 40 may vary according to the desired capacity of system A. In practice, the memory technology used in module 40 is static silicon gate MOS erasable and electrically reprogrammable read only memory chips.

During normal operation of controller A, data is directed from module 40 on lines $D_0-D_7$. The parallel transmission of binary data on these lines provides an eight bit word which is addressed by the logic on lines $A_0-A_{15}$. In FIG. 1, it is indicated that the data lines $D_0-D_7$ are bi-directional at PROM module 40. This is only for the purposes of loading the memory during the programming and debugging operation through direct access module 20. The memory chips of module 40, in practice, are not erasable under normal circumstances; therefore, continuous application of power to this particular module is not required for the purpose of retaining the stored logic. Of course, a variety of different types of read only memories could be used for storing the program information for system A, as schematically illustrated in FIG. 1.

Referring now more particuarly to the random access memory (RAM) module 50, this memory module can be updated periodically during use of system or controller A. Various random access memory modules could be used in system A. The random access memory module 50 includes a somewhat standard parity checking circuit 52 schematically illustrated in FIG. 1. In this manner, information to and from the random access memory chips will be checked for parity in accordance with standard practice to determine an error. In practice, module 50 employs random access solid state memory chips with a capacity of 4,096 eight bit words. In this module, an external battery supply is used for retaining the information or data at the several locations on module 50, until the information or data is changed intentionally by operation of controller A. The semiconductor memory technology used in module 50 is static N-MOS random access technology. The module 50 is addressable for both reading and writing by the logic on lines $A_0-A_{15}$, which address selects the desired address of the RAM module and directs the eight bit word from that location in parallel onto data lines $D_0-D_7$. The DBINP logic and the R/$\overline{W}$ logic determines whether or not the data is being inserted or read from module 50. Operation of a random access memory in conjunction with a microprocessor or other type of digital programmable controller is known and various systems could be employed.

In addition to the PROM module 40 and the RAM module 50, it is possible to provide additional memory which may be in the form of PROM and/or RAM. The parity circuit 52, in practice, is of the type which provides a nine bit word and circuitry necessary to generate and check one bit of odd parity for each word. When an eight bit word is written into the memory a standard, parity generator tests the word being used and generates a ninth bit which will be either a logic 1 or a logic 0 so that the resulting nine bit word will always contain an odd number of logic 1 conditions. When a word is read from the memory, parity check circuitry checks to be certain that the word still contains an odd number of logic 1 signals. If the check circuit encounters an even number of logic 1 signals, the processor is interrupted in accordance with standard microprocessor practice. Other parity checking circuits or systems could be employed so that errors in the accessed information can be detected.

Programmable controller A employs a standard microprocessor which has eight data terminals and 16 address terminals. In this manner, an eight bit word or byte can be serviced simultaneously by the microprocessor. This capacity provides distinct advantages with respect to a reading of several inputs and writing into several outputs. However, the logic processing of a single bit in an eight bit word such as ANDing, ORing, or INVERTing, presents substantial difficulty. A substantial amount of software programming is required to logic process a single bit of an eight bit word or byte. This requires memory space and extensive programming. This disadvantage is even more serious in controlling machines and processes because a great number of simple logic functions are required. In duplicating a standard relay logic diagram or ladder diagram much of the processing is logic processing of single bit information. Thus, to process this single bit information with an eight bit data capacity drastically increases program storage space and control complexity. For instance, when a single input is to be compared with a single output, the use of eight bit input information is a disadvantage. When memory addresses or binary coded data is being transferred or processed, then the large number of data lines is beneficial. To overcome logic processing disadvantages caused by increasing the capacity of the microprocessor, controller system A provides circuitry for obtaining one bit information which can be logic processed on a preselected data line, such as line $D_0$, in a manner similar to a single bit data processor. Thus, it is a relatively simple process to AND, OR and INVERT logic at various inputs and outputs to provide logic functions which are rendered more complex with the advent of the expanded eight bit microprocessor. To illustrate the use of both the byte and bit modes of operation, there is illustrated a byte input and output module 60 and a bit input and output module 70. Module 60 has a series of input words each of which has eight data bits. These words are created by various inputs, such as thumbwheel network 62. In a like manner, the output words from module 60 are illustrated as display signals in a display unit 64. Thus, module 60 is used to input and output a byte of information as an eight bit word into various input or output locations.

A single bit of information is inputted or outputted from the system driver or module 70 on a single data line $D_0$. Thus, when a bit mode of operation is selected by circuitry, constructed in accordance with the present invention, the logic of line $D_0$ only is processed. The logic on the other bi-directional data lines is ignored. To determine whether or not there is a single bit of information directed to the output units 80 through system driver 70, the system driver is controlled by the logic on the input line DBINP and the READ/WRITE line R/$\overline{\text{W}}$. A power supply 12 provides five volts D.C. for operation of the logic in system A and twelve volts D.C. for the operation of certain other components. The 2 volt and 4 volt lines from the power supply 12 are used for retaining the logic of the RAM when power is inadvertently interrupted. These two lines are controlled by rechargeable batteries. Of course, a variety of other power supplies could be provided in accordance with the desired power requirements of programmable controller A.

CONTROL LINE DEFINITIONS

Referring again to FIG. 1, a number of control lines are illustrated as communicating between CPU module 10 and the various other modules comprising the programmable controller system A. These control lines are external of the CPU module; however, in many instances they correspond to or are logically associated with certain communicating terminals on the 8080 Intel microprocessor used in the illustrated embodiment of a programmable controller using the present invention. To appreciate the general operation of programmable controller system A, the basic function of each of the lines illustrated in FIG. 1 will be described separately. Throughout the specification the inverted form of a line designation indicates that a low logic condition, whether pulse or continuous, is the true or "yes" condition. For instance, the READ/WRITE line labeled R/$\overline{\text{W}}$ indicates that the read condition is a logic 1 and the write condition is a logic 0. This convention is used in most equipment employing microprocessors and similar digitally controlled numerical processing devices.

The synchronizing signal line $\overline{\text{SYNC}}$ consists of a 100ns negative or low logic pulse indicating the beginning of each 8080 machine cycle. This pulse is not programmable and is used to latch the status word in each component or module which requires status information from the CPU for use during a total machine cycle which may contain one or more words.

The external clock pulse $\overline{\phi}2$ is created by the CPU internal clocking generator and can be used to synchronize the operation of the various modules. The signal may also be used as an accurate time base. In practice, this clock has either a 2.0 MHz or a 3.0 MHz frequency.

The address lines $A_0$-$A_{15}$ are all logic 0 true, except for $A_{15}$. The logic on these lines is used to provide the address to all memories and I/O modules for controller system A. These address lines are generally output lines from module 10; however, when using the direct access module 20, they are bi-directional and allow input of addresses to module 10. $A_0$ is the least significant address bit in the addressing lines.

The DBINP line indicates the direction of communication of the data lines $D_0$-$D_7$. This control line is used to gate data onto the data bus lines from each of the modules of system A.

The R/$\overline{\text{W}}$ line is used in system A to gate data on the data buses to the addressed locations. In view of the similarity between the DBINP line and the R/$\overline{\text{W}}$ line, they are generally used together. The DBINP line is used to determine the direction of data flow and to gate the data onto the data buses. The READ/WRITE line R/$\overline{\text{W}}$ is used to determine whether this data is written or read. By providing these two control lines, the data on the data bus or lines $D_0$-$D_7$ is stable during the reading and writing pulse on the R/$\overline{\text{W}}$ line.

The $\overline{\text{WAIT}}$ line is used in connection with the READY line. These lines are communicated with the microprocessor, which allows an additional amount of time for reading slower memory or I/O (input/output) locations. If during an addressed output, the module 10 does not receive a logic 1 condition on the READY line, the microprocessor will enter a WAIT state as long as the READY line is at a low logic. In this state, a logic 0 is created on the $\overline{\text{WAIT}}$ line. As soon as the READY input is received, the microprocessor passes out of the WAIT state and a logic 1 appears on the $\overline{\text{WAIT}}$ line. This feature is clearly illustrated in FIG. 2 which relates to the operation of the 8080 Intel microprocessor.

The $\overline{\text{INTE}}$ output indicates the content of an internal interrupt enable flip-flop on the 8080 microprocessor chip. This internal flip-flop may be set or reset by enable and disable interrupt instructions and inhibits subsequent interrupt calls from being accepted by the microprocessor when the flip-flop is in the reset condition. The internal flip-flop which is produced on the chip itself is automatically reset to disable further interrupts at the time $T_1$ of an Instruction Fetch cycle $M_1$ and when an interrupt has been accepted by the microprocessor.

The $\overline{\text{HLDA}}$ line is the Hold Acknowledge line. This line shifts to a logic 0 when a HOLD REQUEST is acknowledged by the microprocessor MP. This HOLD REQUEST is from the line HOLD REQUEST, as shown in FIG. 1. The HOLD condition or stage of the microprocessor shifts the address and data terminals of the microprocessor to a high impedance state so that these terminals release control over the address lines $A_0$-$A_{15}$ and the data lines $D_0$-$D_7$. These lines can be controlled by the access module 20 during programming and debugging. The signal on the $\overline{\text{HLDA}}$ line begins at time $T_3$ for a read memory or input cycle. For a write in memory or an output cycle or operation, the $\overline{\text{HLDA}}$ line is shifted at the clock period following the $T_3$ clocking period. In practice, it is known that the signal on the $\overline{\text{HLDA}}$ line appears after a rising edge of $\phi 1$ of the high impedance on the address lines and data lines occurs after the following edge of $\phi 2$. The HOLD REQUEST line indicates that there has been an external request to shift the CPU, and more particularly the microprocessing chip, into the HOLD condition or state. In this HOLD condition or state, external devices can control the address and data lines as soon as the CPU module has completed its use of these lines for processing the existing or current machine cycle. Control is also relinquished by the CPU module over the DBINP line and the R/$\overline{\text{W}}$ line. In other words, these lines may be controlled by the direct access module 20 for programming or other external control functions. In summary, when a HOLD state is requested, the microprocessor shifts into the HOLD condition or state and gives an output signal on the $\overline{\text{HLDA}}$ line to indicate this HOLD condition. This condition occurs after a certain amount of clean-up during a machine cycle being processed. The HOLD condition or state comes into being at the next machine cycle and holds the existing internal logic on register conditions of the microprocessor chip.

A similar arrangement is used for the reset operation. A Reset Request is created by the power supply 12 or by the direct access module 20 on the RESET REQUEST line. When this request is received by module 10, the microprocessor is reset. In this condition, the content of the internal program counter of the 8080 microprocessor is cleared. After the reset pulse, the program will start at a location word zero in the memory. The internal INTE and HLDA flip-flops of the microprocessor chip are also reset. The internal accumulator, stack pointer, and registers are not cleared. When the reset condition is entered, the logic on the RESET line is shifted to reset the various flip-flops and other logics throughout system A. This arrangement is used for starting controller system A into operation.

The bi-directional data buses or lines $\overline{D_0}$-$\overline{D_7}$ provide eight bit data communication to and from CPU module 10. In addition, these lines are communicated with the various memory modules and I/O modules. The modules which perform only bit functions, as opposed to byte functions, utilize only one of these lines, at least for outputting data. In the preferred embodiment, this line is $D_0$. During the first clock cycle of each machine cycle of the microprocessor, the CPU module outputs a status word on the data line or bus $D_0$-$D_7$. This status word is an eight bit word which describes the current machine cycle. In this status word, the $D_0$ line, in the preferred embodiment, is the least significant bit. The present invention relates to a microprocessor of the type utilizing eight bits of data; however, a different number of data bits can be employed without departing from the intended scope of the invention. With an eight data bit microprocessor the status word can have eight bits generated by the microprocessor according to the instruction or command received from the program.

In microprocessors now available, there is an INTERRUPT capability which is briefly described above. An INTERRUPT capability of the microprocessor allows it to store its present position in a program, jump to a called subroutine, process the subroutine and then jump back to the proper location in the program that was being previously processed. To perform this function, the microprocessor has an INT input and module 10 has several interrupt request terminals INT 0–INT 7. Logic on the INT terminal shifts the microprocessor into the interrupt state. At that time, the INTE terminal ($\overline{INTE}$ line) is energized to prevent subsequent interrupts, until the selected subroutine has reset the INTE terminal at the proper time. A higher priority interrupt can take over operation of the controller before a lower level priority interrupt subroutine is completed, if the INTE has been reset by the processed subroutine. In the past, processing systems utilizing the microprocessor have involved the capability of receiving only a finite, relatively limited number of interrupt requests. This limitation has been dictated by the limitations of the various codes available for subroutine selection or "call". System A employs a system which includes eight interrupt inputs which will shift the microprocessor into the interrupt state. In FIG. 1, interrupts INT 0–INT 3 and INT 5–INT 7 are illustrated. In practice, these interrupts are assigned to external conditions, terminals or parameters, which may be inputs or outputs. The priority of the interrupt requests is in reverse order to the numbering, with the highest priority having the lowest number. The lowest priority has the highest number; therefore, the PWR condition, which is a logic 0 when power has been turned off, is the highest priority interrupt. In this condition, irrespective of other interrupt conditions, the program will shift into the "power off" subroutine which is found at a selected position in memory, which in practice is octal 010. In practice, the next interrupt input is the $\overline{BOOT}$ which creates interrupt request INT 2 to a location in memory. In this manner, a minimum program is available for initial operation of system A. This initial minimum program is located at octal 020 of memory and is "called" by various means schematically represented as a pushbutton in FIG. 1. Interrupt request INT 3 is the module interlock and parity check condition, which is operated in accordance with known practice to maintain continuity of the various modules. The INT 4 interrupt request is a real clock interrupt request, which shifts the program to the octal 040 position in memory. This will be described in more detail with respect to the interrupt functions of system A. INT 5 is a communication interrupt, in the preferred embodiment of the invention. This interrupt generates a location octal 050 in memory. This allows communication from external means, such as the direct access module 20. The interrupt INT 7, which has the lowest priority, places the microprocessor into the interrupt state to read or write from external devices, such as thumbwheels, lights, switches and visual display devices. This leaves INT 6, which is used with modules 30, 32 and 35 to expand the amount of interrupt capability in system A. The IIV6 output acknowledges the receipt and processing of an INT 6 interrupt request. This signal line remains at a low logic while the interrupting device transmits a call from one of the modules 30–34 to the CPU module 10. The call instruction is transmitted synchronously with a $\phi$2 clock signal and provides the address in memory to which a call is placed during a selected additional interrupt provided by the add-on modules, only three of which are shown.

This description of the basic lines or command paths directed to and from CPU module 10 will be sufficient for a full appreciation of the invention which contemplates an improved module used with a microprocessor programmable controller of the type schematically shown in FIG. 1. These outputs and input lines correspond in nomenclature used by Intel Corporation for its 8080 microprocessor chip used in the preferred embodiment of the present invention. Corresponding nomenclature is used in other commercially available microprocessor chips which have the characteristics set forth generally herein as background and explanatory information well known in the field. The characteristics of this microprocessor chip are well known. Module 10 could produce an I-STROBE control line for software production of a strobe to the various inputs and outputs, if desired.

STATUS WORD FOR MICROPROCESSOR

In the microprocessor utilized in module 10, as in most microprocessors, a status word appears on the data terminals at the first of each machine cycle. This status word indicates the operation to be performed by the microprocessor during the current machine cycle. Although a variety of status codes and conditions could be provided, the ten status words of the Intel 8080 microprocessor are illustrated in the chart shown in FIG. 2. The data terminals have the coding indicated in the vertical columns for each of the various types of machine cycles during the initial part of the cycle. The binary status code on terminals $D_0$–$D_7$ is latched into a status latch at the initial synchronization pulse in the $\overline{SYNC}$ line.

When the machine cycle is an INSTRUCTION FETCH, the coding on data lines $D_0$–$D_7$ as latched into the status latch will be 01000101. The binary code on each of the data terminals during the initial part of the cycle indicates a condition, as set forth in the status information column. In accordance with Intel 8080 terminology, the logic of data bus $D_0$ is the interrupt acknowledge (INTA). This logic indicates whether an interrupt request has been acknowledged and can be used to gate a restart instruction onto the data buses when the DBIN or DBINP line is active. The logic on the $D_1$ line during the initial part of the machine cycle indicates whether or not there is a writing function. This status is labeled $\overline{W}$ and is a logic 0 when the machine cycle will write data into memory or into an output location. When a logic 1 appears on the $D_1$ instruction line and is latched at the status latch, a memory or input location is read. A logic 1 on the $D_2$ line during the instruction read portion of the cycle indicates that the address buses $A_0$-$A_{15}$ hold the push down stack address from the stack pointer of the microprocessor. This status labeled STACK, is active during only a STACK READ or a STACK WRITE machine cycle.

When a logic 1 appears upon the $D_3$ data line during the initial micro cycle of a machine cycle, this indicates that HALT has been acknowledged. As can be seen in FIG. 2, this occurs during a Halt Acknowledge machine cycle or an Interrupt Acknowledge While Halt machine cycle. Otherwise, during the initial micro cycle, which is labeled $T_1$ in FIG. 3, this data bus $D_3$ is a logic 0. During an output function, the logic on line $D_4$ is a logic 1. This occurs when the machine cycle is an Output Write cycle. A logic 1 on the $D_4$ data line indicates that the address buses contain the address of an output device and that the data bus will ultimately, during the cycle, contain the output data when the $R/\overline{W}$ line is at a logic 0. The logic on data line $D_5$ provides a signal to indicate that the microprocessor is in the FETCH cycle for the first byte of an instruction. Thus, a logic 1 on $D_5$ during the initial portion of the machine cycle indicates that an instruction is to be obtained from memory or another location. This is the status $M_1$ illustrated in FIG. 2. The status INP is contained upon data line $D_6$. A logic 1 on this line during the status portion of a machine cycle indicates that the address buses contain the address of an input device and the input data should be placed upon the data buses when the DBIN output of the microprocessor is active. This output of course corresponds to the DBINP line of the CPU module 10. MEMR logic appears upon the $D_7$ data bus. A logic 1 on this bus during the status information portion of the cycle designates that the data buses will be used for a memory read operation.

During the status portion of any cycle, the coding upon data lines $D_0$-$D_7$ are the codes indicated in FIG. 2. This coding is an inherent function of the 8080 microprocessor and is set forth only for the purpose of a more convenient arrangement for understanding the preferred embodiment of the present invention.

BASIC INSTRUCTION CYCLE FOR CPU MODULE

The microprocessor employed in the preferred embodiment of the present invention has a basic instruction cycle as illustrated in FIG. 3. The microprocessor is timed by the input pulses $\phi 1$, $\phi 2$, the first of which determines the initial portion of a micro cycle labeled $T_1$-$T_5$. The micro cycle $T_W$ is set forth for the purpose of designating a wait condition which was described earlier with respect to the interplay between the READY logic and the WAIT logic. If a memory is not ready, then the microprocessor goes into a WAIT state represented by a logic 1 on the WAIT line, i.e. a logic 0 on the $\overline{\text{WAIT}}$ line. When the memory is then ready, the WAIT line shifts back to a logic 0 and the microprocessor continues into micro cycle $T_3$. For each machine cycle there is a synchronizing pulse labeled SYNC. This synchronization pulse corresponds essentially to the internal synchronizing pulse of the 8080 microprocessor. The pulse has been shaped somewhat. The pulses shown in FIG. 3 are those entering and leaving the module 10; however, they are basically the pulses from the microprocessor itself. During each of the micro cycles, the function set forth at the lower portion of FIG. 3 takes place. Sometime three micro cycles are used. In other instances, many micro cycles are required for a particular instruction. For instance, in an Intel 8080 when memory is accessed, as many as eighteen micro cycles may be used in normal operation. During the $T_1$ micro cycle of a machine cycle, the logic on lines $D_0$-$D_7$ is read. The address on lines $A_0$-$A_{15}$ (at the address terminals of microprocessor MP) is provided by either the internal program counter or another register within the microprocessor. This address information is placed into the program counter or register during a prior machine cycle. The DBINP line corresponds to the internal DBIN line. This determines whether or not data is placed on the data lines $D_0$-$D_7$, in a subsequent portion or micro cycle of the machine cycle. During the initial portion, the data at the data terminals of the microprocessor indicates the type of cycle to be processed during the machine cycle which may require several micro cycles. The logic on the lines designated in FIG. 3 changes according to the type of instruction to be processed in accordance with well known practice in the microprocessing art. These logic conditions will be employed throughout the description of the preferred embodiment of the present invention.

PREFERRED EMBODIMENT

Figure 4:
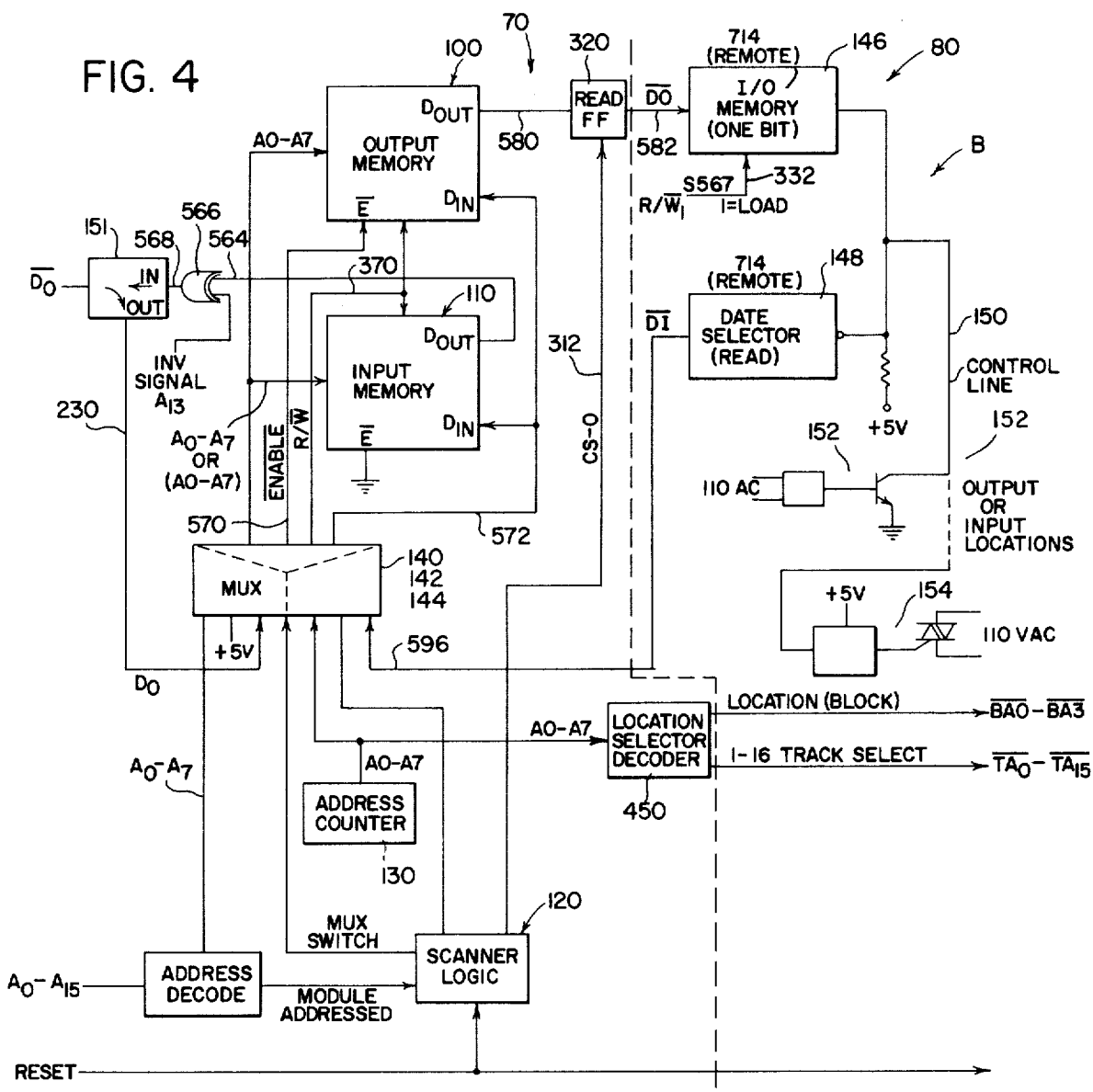
FIG. 4 is a block diagram illustrating the operating characteristics of the preferred embodiment of the present invention taken together with a schematic representation of a single, representative external addressable location.
Figure 7:
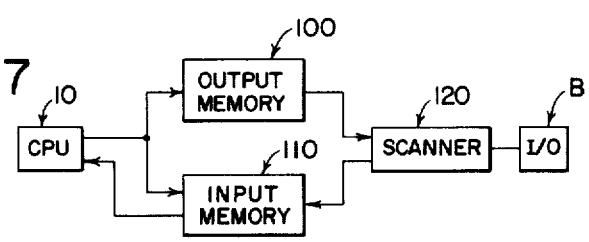

In accordance with the preferred embodiment of the present invention, the system driver 70 is provided with a unique operating characteristic for controlling each of the several locations in the I/O (BIT) units 80. In accordance with the system illustrated in FIG. 1, several types of I/O drivers or bit modules could be used for controlling the input and output of information to the various locations or terminals connected to the I/O units or modules 80. In accordance with the present invention, I/O driver or module 70 includes the circuitry shown in detail in FIG. 6, which is comprised of FIGS. 6A, 6B. FIG. 6 is separated for convenience into Part I and Part II which are considered together. The general layout of the connection between the I/O driver and one addressable output location is illustrated in FIG. 4, which indicates the use of the module or driver 70 as contemplated by the present invention. Module 70 includes an output memory unit 100 and an input memory unit 110, each of which includes 256 separate addressable locations for single bit information. A scanner circuit 120, shown in the lower right hand portion of FIG. 6A (Part II), is used to scan the output memory unit and input memory unit on a continuous basis until I/O data is to be changed or read by CPU 10. One of the addressable external locations is schematically shown as input or output unit B in FIG. 4. An address decoder 130 creates fictitious addresses A0-A7 corresponding to external units B. These addresses are used by scanner circuit 120 to scan the various locations in memory units 100, 110 corresponding to external locations. A plurality of multiplexing units 140, 142 and 144 are used to shift from either the scanning operation or to an operation wherein the CPU 10 updates a selected unit B or reads information from one of these units. In general, scanner circuit 120 cycles through several states on a generally continuous basis. Under normal circumstances the scanning has no effect upon the state of the external units B. When a data change is to be made, the CPU 10 obtains access to the memory units 100, 110 by shifting the multiplexing units 140, 142, and 144 into the CPU access condition. At that time, the CPU writes information into both the output memory unit and the input memory unit, as schematically illustrated in FIG. 7. Thereafter, scanning circuit 120 resumes its operation and shifts the information to an output location or unit B. If during the scanning operation an input at an external location or unit B changes in state, this is placed into input memory unit 110 by the scanning circuit. During the scanning process, any change in the data to be directed to an output location B is placed into the input memory. Thus, the scanning operation updates the input and output memory units so that the input memory unit contains data indicative of the condition of both input and output units B. The CPU reads a memory location by obtaining access over the system used in module 70. Then, the CPU reads the condition of the input memory 110. This memory unit contains the condition of external location or unit B, whether it is an output location or an input location. Thus, the CPU can read the condition of any output or input unit B by reading memory 110. By using this system, lines communicating between the individual input or output units B and the module 70, controlling the same, can be relatively long without affecting the timing of system A as controlled by CPU 10. Thus, system A can control input and output units B located at substantial distances, i.e. over 100 feet or over about 30.5 meters, from system A itself. Scanner circuit 120 is provided with addresses for memory locations in memory units 100, 110, by an address counter 130. In FIG. 4, each unit B is controlled by a one bit I/O memory 146, so that the condition of a selected one of the units B is controlled by the logic directed to this I/O memory. The memory 146 is located in one of the I/O modules 80, as shown in FIG. 1. Each of the external units B is controlled by a line BA0–BA3 selecting one of the units on one of sixteen tracks or modules 80. The line BA0–BA3 activates one external location by activating the I/O memory 146 during an external READ signal or by actuating the data selector 148. The operation is controlled by the logic on the R/W$_1$ line from module 70 and is independent of the programmed READ and WRITE signals. When a unit B is located in an external addressable location, the unit is connected to both the I/O memory 146 and the selector 148 by a control line 150. If the location is unoccupied by a unit B, the I/O memory and selector can act as a useable single bit memory location. The address selector or data reading device 148 is provided on module 80 for communication of the condition of unit B or memory 146 with system driver 70. Control line 150 can be relatively long without affecting the timing of system A. As illustrated in FIG. 4, this control line can either be an input line connected to an input circuit 152 or an output line connected to an output circuit 154. In these particular circuits, the input and output circuits are 110 A.C. volt circuits. Of course, other voltages could be used for input and output information. A logic 0 in line 150 indicates that the input circuit 152 is in the ON condition. This reads an input logic 0 condition at line 150, which logic is directed to selector 148. This selector also reads the condition of the I/O memory 146, irrespective of any connection to line 150. Thus, the I/O memory 146 can be a memory location for use by system A without being connected directly to any input or output unit B by a line 150. An output circuit 154 can be connected to control line 150. In this instance, a logic 0 in this line and stored in I/O memory 146 creates a gating pulse to the output circuit, indicated as a 110 volt triac controlled circuit. The versatility of using the universal input/output concept is quite apparent. For instance, during debugging, the one bit memory 146 can accept the condition of a input or output circuit without being connected to that circuit. This intended condition can then be read by the CPU in normal fashion as if an input or output were actually connected. Of course, the single bit I/O memory 146 and the data selector 148 are generally in a unit having several separate addressable locations selected by the address on lines $\overline{TA_0}$ to $\overline{TA_{15}}$ and lines BA0–BA3. This address will be the decoded result of an address which can be created by the CPU on address lines $\overline{A_0}$–$\overline{A_{14}}$, $A_{15}$. In the illustrated embodiment, the address for a particular I/O memory 146 or data selector 148 is contained on the $\overline{BA0}$ to $\overline{BA3}$ lines and the $\overline{TA_0}$–$\overline{TA_{15}}$ lines. These latter lines select the group of output units B being selected, i.e. a track on module 80, and the former lines select particular block, i.e. external location, on the module or track being addressed by the TA lines. Other arrangements for addressing a particular external location or unit B can be used without departing from the intended spirit and scope of the invention which relates to a particular concept used in the system driver 70, as best shown in FIGS. 6A and 6B. The overall operation of the system as so far explained is schematically illustrated in FIG. 7.

Figure 5:
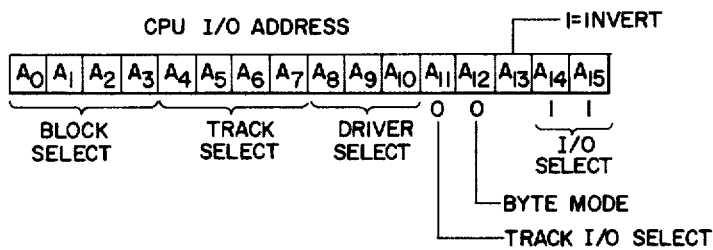
FIG. 5 is an address of the type which can be used in processing information in the preferred embodiment of the present invention.

Referring now to FIG. 5, there is illustrated an address used by system A to allow the CPU to access module 70 for changing the condition of the unit B, reading the condition of the unit B or reading or writing into the input/output memories of module 70. In this illustration, address lines $A_0$–$A_{15}$ are coded as indicated and appear with either a programmed READ or WRITE signal on the DBINP and R/$\overline{W}$ lines, as shown in FIG. 3. Address lines $A_4$–$A_7$ select the particular module 80, indicated as a track. Address lines $A_0$–$A_3$ are used to select one of 16 units B controlled by one of the modules 80, as schematically illustrated in FIG. 4. Address lines $A_8$–$A_{10}$ select the module 70 located in the chassis of system A. In practice, more than one module could be used in system A. In addition, other modules in the system A can be addressed by changing the code on these three lines. A logic 0 in line $A_{11}$ indicates that this address is for a I/O select. A logic 0 in line $A_{12}$ indicates that the system A is the byte mode even though the input from module or driver 70 is a single bit connected to the bi-directional data line $\overline{D_0}$. The logic on line $A_{13}$ indicates whether or not the selected information is to be inverted on line $\overline{D_0}$. A logic 1 in this line, as will be illustrated in connection with FIGS. 4 and 6, indicates that the logic applied to the data line of system A is in the inverted form. A logic 1 appears in lines $A_{14}$ and $A_{15}$ which indicates that this is an I/O address, as opposed to a memory address for selected location in the various memory units shown in FIG. 1. Of course, it is appreciated that even though a logic 1 appears in lines $A_{14}$, $A_{15}$ the input/output memory units 100, 110 can be used as single bit memory locations for use by system A. In that instance, an I/O address is used, since module 70 is considered an input/output module when being written to and read by CPU 10. This representative address will be used throughout the description of the preferred embodiment of the present invention, which relates to the internal structure of module 70 and its operation with respect to the input/output locations of system A, as controlled by I/O modules 80.

Referring now to FIG. 6A (Part I and Part II), several lines are applied to the left hand side of module 70. These lines are interconnected with the lines of system A as illustrated in FIG. 1. Address lines $\overline{A_0}$-$\overline{A_7}$ are logic 0 true lines from CPU 10 or, in some instances, direct access module 20. Lines $\overline{A_8}$-$\overline{A_{11}}$, $A_{14}$ and $A_{15}$ are decoded and provide a logic 1 at the "board address by CPU" line 200 when an address, as shown in FIG. 5, is being processed by the CPU selects module 70. Line 200 is used to gain access to module 70 in a manner to be described later. Address line $A_{13}$ is used to invert the logic being selected from a location addressable by address lines $A_0$-$A_7$. The $\overline{D_0}$ is the bi-directional data line which is controlled by module 70 for input of data and output of data from the CPU, or the direct access module 20 in some instances. The $\phi_2$ line is the operating clock pulse train for CPU 10 and is used in module 70 only for synchronization purposes. It is appreciated that this system clock allows the operation of module 70 in accordance with the timing used in CPU 10. This does not form a part of the present invention and is illustrated for interfacing module 70 with system A. The $\overline{RESET}$ line is a logic 0 when system A is being RESET. The operation of this line will be apparent from consideration of FIG. 6. Basically, the $\overline{RESET}$ line resets module 70 and modules 80 in accordance with normal practice. An I-STROBE signal is a logic 0 when scanner circuit 120 of module 70 is to be disabled. A logic 1 at the I-STROBE terminal enables scanner 120 for normal operation. In this manner, a software signal can be used to stop the operation of module 70 at any given time. This is not a part of the present invention and is illustrated as a feature which can be employed with the invention as illustrated in FIG. 6. A $\overline{DBINP}$ line is at a logic 1 when data is to be directed from CPU to the various locations in memory units 100, 110. A logic 0 pulse in this line causes data to be directed from the input memory to the CPU during a programmed READ cycle. The logic of terminal $\overline{DBJMP}$ is the reverse of the DBINP line illustrated in FIG. 3. The R/$\overline{W}$ terminal of module 70 is at a logic 0 during a READ signal as controlled by the DBINP line. This is shown in FIG. 3. In this condition, data from the memory 110 is directed to the CPU as illustrated in FIG. 7. When there is a programmed WRITE signal at their terminal, a logic 1 pulse or signal appears, as indicated in FIG. 3. At that time, data on the $\overline{D_0}$ line of CPU 10 can be directed and placed into the memory units 100, 110. Thus, the $\overline{DBINP}$ line is used in a programmed READ cycle and the R/$\overline{W}$ line is used in a programmed WRITE cycle.

A logic 1 on the $\overline{I/O\ INTERLOCK}$ indicates that there has been no failure at any of the preceding module connection. A logic 0 at this input terminal of module 70 indicates a lack of interlock which can be directed back to the system A by the I/O INTERLOCK output terminal. By accepting an address as indicated in FIG. 5 and a command on the $\overline{DBINP}$ or R/$\overline{W}$ lines, module or I/O driver 70 is operative in a manner which will be apparent from the following description.

In the basic operation, scanner circuit 120 shifts between several states during each generated external address created at the output terminals A0-A7 of address counter 130. These addresses are separate from the addresses on lines $\overline{A_0}$-$\overline{A_7}$, but are the same coding. For instance, an address for a given external location will be generated by counter 130 and can be directed by CPU 10 into lines $\overline{A_0}$-$\overline{A_7}$. These generated addresses and states are directed through the multiplex circuits 140, 142 and 144 to control the logic in memory units 100, 110 during the scanning operation. As long as there is no change in the input condition of a unit B used as an input and no requested information to or from CPU 10, the scanning by circuit 120 has no effect. When there is a change in condition, the scanning operation causes updating of the memory conditions and the external conditions. When there is a request for access by the CPU, the multiplexing circuits are shifted and the addresses on line $\overline{A_0}$-$\overline{A_7}$ are used to either WRITE or READ the information at memory units 100, 110.

In the preferred embodiment of the invention, the detailed circuitry shown in FIG. 6 is employed for the purposes outlined above. In this preferred embodiment, the data line $\overline{D_0}$ is connected th a data transfer device 151 having a direction control terminal $D_1$. When this terminal is at a logic 0, data on the In terminal is transferred to data line $\overline{D_0}$. When terminal $D_1$ is at a logic 1, data is shifted from the $\overline{D_0}$ line to the OUT terminal of transfer device 151. Thus, the logic on the $D_1$ terminal indicates the direction of data transfer through device 151. As previously mentioned, during a prgrammed WRITE command, the $\overline{DBINP}$ line has a constant logic 1. This logic is inverted by inverter 153 to the input of NAND gate 155. Thus, during a programmed WRITE cycle or command from CPU 10, the logic 1 at the $\overline{DBINP}$ terminal of module 70 produces a logic 0 at one input of gate 155. This produces a logic 1 in output 157 of this gate. This line is connected to the $D_1$ terminal of data transfer device 151. This logic 1 transfers the logic from the $\overline{D_0}$ line, in inverted form, as indicated by the circle at the input, to the OUT terminal of device 151. Thus, to WRITE into module 70 inverted data from bi-directional data line $\overline{D_0}$ appears at the OUT terminal of transfer device 151. During the READ cycle, the R/$\overline{W}$ line 160 is at a constant logic 0. Line 160 controls NAND gate 162. A logic 0 during the READ cycle produces a logic 1 in output line 164 of gate 162 Thus, gate 155 is enabled. During a READ cycle, the $\overline{DBINP}$ line ultimately shifts to a logic 0. This is inverted by inverted 153 to cause all inputs at gate 155 to be at a logic 1. One of the other inputs to this gate is the CPU enable line 200. Line 200 is at a logic 1 during both the programmed WRITE or the programmed READ cycle to or from CPU 10. With all logic 1 signals at the inputs of gate 155. a logic 0 appears in control line 157. This shifts data transfer device 151 so that data from the IN terminal is transferred, in inverted form, to the bi-directional data line $\overline{D_0}$. The function of this transfer device will be more apparent during the discussion of the operation of module 70. Line 160, which is controlled by the R/$\overline{W}$ logic from CPU 10 is connected directly to an A terminal of multiplexing circuit 144. Also, the logic on line 160 controls AND gate 170 having an output 172 forming one input of OR gate 174. Gate 174 has an output 176 directed to a second OR gate 178. The operation of these gates is apparent. They are used to disable address counter 130 and scanning circuit 120 under certain operating conditions, for instance, when the CPU gains access to module 70.

Referring again to the CPU enable line 200, this line is at a logic 0 when CPU is not requesting access to module 70. When access is being requested, a logic 1 appears in line 200. This logic is controlled by the address on line $\overline{A_8-A_{10}}$, $\overline{A_{11}}$, $\overline{A_{14}}$ and $A_{15}$. A logic 1 in line 200 enables the data transfer gate 204, which is a NAND gate. Inverted 206, at the right hand side of FIG. 6A, inverts the logic of CPU line 200 and applies it to output 208, which is the input of OR gate 210. This gate has an output 212 which controls the shifting of multiplexing units 140, 142 and 144. Thus, a logic 1 on line 200 shifts the multiplexing circuits to A terminals and provides control of memory units 100, 110 by the CPU. A logic 0 on line 200 shifts output 212 of gate 210 to a logic 1 which shifts multiplexing units 140, 142 and 144 to the B input terminals. Thus, when access is being requested by the CPU, multiplexing units 140, 142 and 144 are at the A terminals for transfer of data through to FIG. 6B. CPU line 200 also controls previously described gates 155 and 170. In addition, AND gates 220, 222 are enabled when a logic 1 appears in CPU line 200. Thus, a logic 1 in CPU line 200 controls READ, WRITE gate 155 for directing data through transfer device 151, disables scanning circuit 120 and shifts the multiplexing circuit into the non-scanning condition with data transfer being from the A input terminals. Multiplexing circuits 140, 142 and 144 transfer data from left to right as shown in FIG. 6A (Part I and Part II).

During control by CPU line 200, input data from bi-directional data lines $\overline{D_0}$ is directed through line 230 connected to the OUT terminal of device 151 to one input of transfer gate 204. Output 231 of this gate is directed to the 3A terminal of multiplexing circuit 144 for transfer through this circuit during CPU control of module 70. The other input 232 of gate 204 is normally at a logic 1 since this is controlled by the RESET flip-flop 240, including NAND gates 242, 244. The other output of this flip-flop is output line 250 which is the RESET COUNTER line and is normally at a logic 0. Line 250 shifts to a logic 1 during the rest operation of system A. Thus, line 232 is normally at a logic 1. This logic condition enables the data transfer gate 204 under normal circumstances. Line 232 also controls gate 182 which is used for disabling counter 130 under conditions to be described later. In addition, the normal logic in line 232 is directed to data input gate 260 shown in the upper portion of FIG. 6A. Under normal circumstances, this gate is enabled by the logic 1 in line 232 for transfer of data from the addressed I/O unit B, one of which is shown in FIG. 4. As a final function, the normal logic 1 in line 232 enables the I-STROBE gate 262, as shown in FIG. 6A (Part II). Thus, the I-STROBE signal can be received by module 70 unless flip-flop 240 is toggled by a RESET signal at gate 242.

Referring now to scanner circuit 120, shown in the lower right hand portion of FIG. 6A (Part II), this circuit includes a 1 of 16 state decoder 280 with sixteen different states, designated states 0-15. These states each appear as a logic 0 at one of the numbered output terminals. Only certain terminals are indicated; however, in practice sixteen terminals are available. The binary logic on input terminals A, B, C and D are decoded in binary fashion and applied at the inverted terminals 0-15 of decoder 280. Input terminals A, B, C and D are controlled by a binary counter 282 of standard design having output lines 282a, 282b, 282c, and 282d. As this counter counts between the logic state of 0000 and the logic state of 1111, state decoder 280 shifts a logic 0 progressively from the least significant terminal (0) to the most significant terminal (15). The RC terminal of counter 282 shifts to a logic 1 when the output lines 282a-282d of counter 282 are all at a logic 1. This logic 1 controls NOR gate 286 to produce a logic 0 in the LOAD line 290. Thus, after counting to the maximum number, counter 282 is loaded with all logic zeros as indicated by the grounded input terminals A, B, C and D of the counter. The use of a LOAD line 290 allows the counter to also be controlled by the logic in line 180 to stop the counter and shift lines 282a-282d to the logic 0 state upon certain CPU controlled commands. In this manner, state decoder 280 can be shifted back to the first state before completing all sixteen states in sequence. As indicated on the state decoder, the states are 0-15, some of which are omitted for simplicity. In state 0, line 300 shifts to a logic 0. This is inverted by inverter 302 to produce a logic 1 in line 304, also labeled SO. Line 304 is directed to the 2B terminal of multiplexing circuit 144. Thus, a logic 1 appears at the 2B terminal to produce a logic 0 at the output 570 of circuit 144 during state 0. Thus, the $\overline{\text{ENABLE}}$ line 570 is at a logic 0 to enable output memory unit 100. At the same time, line 304 enables $\phi_2$ gate 310 to produce a clock pulse in line 312. This clock pulse is directed to a READ output flip-flop 320. This clocks the flip-flop to read one bit of information from the output memory 100. As is apparent, output memory 100 will be in the enabled and READ mode for this scanning state. A logic 1 will be presented to the created R/$\overline{\text{W}}$ line 370, as will be explained later. A logic 1 to memory unit 100 allows reading of memory unit 100 to give the addressed data at the $D_{OUT}$ terminal for use by flip-flop 320.

Scanning states 1-4 are cycle to provide time to settle the circuitry. During states 5, 6 and 7, a logic 0 appears at the three inputs to gate 330. This produces a logic 1 in output line 332 which is also labeled line S 567. This line directs a R/$\overline{\text{W}}_1$ signal to the several I/O memory units 146 on the addressed module 80. Only the addressed output I/O unit 80 will be affected by the signal on line R/$\overline{\text{W}}_1$ which is independently created READ/WRITE command line. Line 370 is also a created READ/WRITE line when scanning circuit 120 is operative. A logic 1 in line 332 causes the addressed I/O memory location 146 to write the data from flip-flop 320 into the proper I/O memory 146 of a location or unit B. Thus, the information at the addressed location in output memory 100 is transferred to one of the remote locations which may be an input unit, an output unit or an auxiliary memory location. If there has been no data chnage, this process does not change the data at the single bit memory unit 146. Scanner states 8, 9 and 10 are cycled to settle the logic. At state 11 of decoder 380, line 340 shifts to a logic 0. This is inverted by inverter 342 to produce a logic 1 in line 344. This line is directed to gate 220 to determine whether or not CPU 10 is seeking access by a logic 1 in line 200. If access is being sought, a logic 1 appears in line 350. This disables $\phi_2$ gate 352 and produces a logic 1 in line 354. This stops the binary counter 282, if access is being requested by the CPU during the scanning cycle. If not, a logic 0 in line 340 has no effect on the circuit shown in FIG. 6A. If counter 282 has been stopped by a CPU request, scanning circuit 120 will be held at state 11. If a programmed WRITE signal shifts line 160 to a logic 1, gate 170 resets counter 282. If there was a programmed READ signal, gate 170 is not actuated. When access has been relinquished by a new address on lines $\overline{A_0}$-$\overline{A_{14}}$ and $A_{15}$, counter 282 will continue to state 12 by operation of gate 352. If the CPU is not asking for access, decoder 280 shifts to state 12. In this state, a logic 0 appears in line 360. At that time, inverter 362 inverts the logic to produce a logic 1 in line 214. This line controls multiplex gate 210, as previously described. Thus, if CPU access is requested at state 12, line 214 prevents gate 210 from shifting the multiplexing units. Thus, state 12 is performed irrespective of an access request by the CPU indicated by a logic 1 in line 200. State 12 enables $\phi_2$ gate 364 so that a clocking pulse occurs in line 366. This is indicated at the CS12 line. This produces a clock pulse at the input of OR gate 368, which is also connected to line 250 having a normal logic 0. Thus, a logic 1 is applied to the 1B terminal of multiplexing circuit 144. This produces a logic 0 in line 370 during scanning state 12. This allows the logic from the external $\overline{DI}$ input line to pass through multiplexing unit 144 to the $\overline{DATA}$ line 572 for writing into input memory module 110. The same data is not written into the output memory unit 100 because line 304 is at a logic 0 and $\overline{EN}$-$\overline{ABLE}$ line 570 is at the disabling logic 1 condition. This disabling logic is applied to only output memory unit 100. Thus, if there has been a change in the input data, it changes the logic in input memory 110, as shown schematically in FIG. 7.

The last illustrated state of decoder 280 is state 13 which produces a logic 0 in line 380. This is inverted by inverter 382 to produce a logic 1 in line 384. Thus, $\phi_2$ gate 390 is enabled. This produces a clock pulse in output 392 of this gate. This line is also labeled CS13. Line 392 controls OR gate 400 to produce an incrementing pulse or clock in line 402. This controls NAND gate 404 having a second input from $\phi_2$ gate 406 at line 408. Consequently, if there has been no system RESET to shift line 350 to a logic 1, the incrementing pulse in line 402 increments counter 130 by line 410. In that menner, after state 13 of decoder 280, a new set of addresses is provided at the output terminals of counter 130. This scanning cycle is then repeated with the new address being addressed to the output memory 100, the input memory 110 and the external units 80 for controlling selected I/O units B. Thereafter, states 14 and 15 occur at the output of decoder 280. At state 15, gate 286 produces a logic 0 in LOAD line 290 for counter 282. Counter 282 is loaded with a logic 0 at all output terminals A, B, C and D. This causes a new scanning cycle. This procedure continues until access is requested or other external conditions cause interruption of the scanning cycle.

For each scanning cycle, a new address corresponding to an external location is generated at output terminals A0-A7 of counter 130, as shown in FIG. 6A (Part I). This counter includes two separate stages each of which has input terminals A, B, C and D. These terminals are normally latched to a logic 1 by resistor networks 420, 422. Overriding switches 424 are connected to RESET line 250 which is normally at a logic 0. By closing one or more of switches 424, the number loaded into counter 130 can be varies. By closing a succession of the least significant bit (LSB) switches, the lower stages of coutner 130 can be loaded with logic 0 conditions. In a like manner, by closing one or more of the most significant bit (MSB) switches, the higher loaded number is loaded into counter 130. In this manner, if only a lesser number of the different addresses available at the output terminals of counter 130 are needed, the number of generated addresses can be limited by changing the loaded logic controlled by switches 424 and networks 420, 422. By reducing the number of counts necessary to down count counter 130 to zero, the time necessary to process all available addresses at the output terminals of counter 130 can be reduced. After counter 130 has down counted to zero, the logic at inputs A, B, C and D is loaded into counter 130. A closed switch 424 loads a logic 0 under normal conditions. Networks 420, 422 load a logic 1 at any input terminal having an open switch 424.

The use of switches 424 connected to RESET Line 250 has a distinct advantage. During a system RESET cycle, a logic 1 appears in line 250. Thus, if a switch 424 to a given input terminal is closed and counter 130 is loaded, a logic 1, instead of a normal logic 0, is transmitted to the input side of counter 130. Counter 130 is loaded to the maximum number and all 256 addresses are processed during the next scanning cycle after a system RESET. In this manner, the unused output locations addressable by lines A0-A7 can be updated and set to a selected logic for use later as memory locations. During the next scanning cycle, counter 130 is loaded with the number determined by the setting of switches 424. For maximum capacity of counter 130 during normal scanning, switches 424 are left open.

The output lines from counter 130 are labeled A0-A7 and correspond to address lines $A_0$-$A_7$ from CPU 10. The counter generated addresses are created for use by multiplexing circuits 140, 142 and are connected to the B terminals of these circuits. Thus, during a scanning cycle the generated addresses from counter 130 are processed in sequence, irrespective of the addresses on the address lines of system A. Generated address lines A4-A7 are directed to a 1 of 16 track decoder 450 for creating the track addresses $\overline{TA0}$ to $\overline{TA15}$. Thus, during the scanning cycle, the logic on lines A4-A7 selects a particular module 80 which is to be addressed, i.e. activated. Generated address lines A0-A3 are used as the $\overline{BA0}$ to $\overline{BA3}$ lines. These lines select the particular external location or unit B of the selected module 80 which is to be controlled during the generated address from counter 130. As will be seen, during CPU access to module 70, the CPU addresses output memory 100 and the input memory 110. The CPU does not send an address out to modules 80. The CPU reads only the condition of the memory on module 70. The output and input memory units 100, 110 contain the conditions of all inputs and outputs and the condition of any vacant location which is being used as an auxiliary memory location for system A.

Counter 130 counts down from the maximum loaded number in a binary fashion by pulses received at clock terminal CK, which is connected to output line 410 of incrementing gate 404. At the ZERO condition of counter 130, terminal Z shifts to a logic 0. This signals the end of the down count sequence. All digital numbers determined by networks 420, 422 and switches 424 have been generated in lines A0-A7. The logic 0 at terminal Z is directed to the $\overline{ZERO\ COUNT}$ line 460 which controls the counter loading network 470 including inverters 472, 474 and NOR gate 476. The output 476 of this circuit is directed to the load terminal $\overline{LD}$ of counter 130. Thus, after a cycle of counter 130, a logic 0 is directed in line 460 to inverter 472. This produces a logic 0 in line 478 to again load counter 130 at the selected loaded number. Line 460 is normally at a logic 1; therefore, this line enables gate 244 for subsequent shifting during the reset by a logic 0 pulse in line 500.

A logic 0 in the RESET line 500 shifts line 250 to a logic 1 at gate 242. This applies a logic 1 to all inputs of counter 130. Also, line 250 inhibits gate 368 to place the memories 100, 110 in a constant write mode. An inverter 502 shown in FIG. 6B inverts the logic on line 500 to produce a RESET pulse for use by modules 80. Thus, the system RESET pulse or signal is passed through module 70 to modules 80. This resets any circuitry on these modules that requires resetting at the time when system A is reset. Also, flip-flop 320 is reset by a logic 1 in line 500. During the RESET cycle, loading network 470 is actuated by line 500 to produce a logic 0 in line 478. Thus, during a RESET cycle, counter 130 is loaded with a logic 1 at all counter positions. The purpose of this function has been previously described.

Referring now to the I-STROBE line 510, a logic 0 on this line produces a logic 1 at output 512 of AND gate 262. This produces a logic 1 at the input of gate 178. Thus, line 290 is shifted to a logic 0. This resets counter 282 by loading a logic 0 into each of the four counter stages. Consequently, during an I-STROBE pulse, scanning circuit 120 is reset to the first state. The module interlocking arrangement is used to assure that all the modules are secured into system A. A variety of arrangements could be employed for this purpose; however, in accordance with the illustrated embodiment, the $\overline{\text{I/O INTERLOCK}}$ provides a logic 1 in line 520 when modules preceding module 70 are in place. A gate 522 compares this signal with the B + MONITOR from all modules 80 which is also a logic 1 if all modules 80 are in place. This logic 1 in line 524 combines with the logic 1 in line 520 to produce a logic 0 in I/O INTERLOCK line 526 to indicate proper continuity.

Referring now to FIG. 6B, a single bit of data from input memory 110 is provided at line 560 for use by the CPU. This line includes an inverter 562, shown in FIG. 6A. The output of this inverter is line 564 which is connected to one input of an EXCLUSIVE OR gate 566. The other input of this gate is the invert logic line $\overline{A13}$. Thus, the output line 568 directs the proper form of logic to the IN terminal of data transfer device 151. This data is then transferred, as explained later, to data $\overline{D_0}$ line for use by the CPU during a programmed READ cycle from the CPU.

Referring now more particularly to multiplexing circuit 144, this circuit includes the output line 370 which controls the operation of output memory 100 and input memory 110. During a READ signal, line 370 is at a logic 1 and data from the addressed locations of memory units 100, 110 is directed to the $D_0$ terminal of these units. Memory units 100 must be enabled by logic 0 in the $\overline{\text{ENABLE}}$ line 570 before either input or output operation. During CPU access, line 370 is the inverted form of line 160 and contains the R/W logic as shown in FIG. 3. During scanning, the logic on line 370 is controlled by the state decoder 280. The logic is shifted furing state 12. Line 570 is the $\overline{\text{ENABLE}}$ line for output memory unit 100. During CPU access, the 2A terminal of multiplexing circuit 144 is latched to a +5 volt logic 1 condition. This produces a logic 0 in $\overline{\text{ENABLE}}$ Line 570. This enables output memory 100 during CPU access. Input memory 110 is enabled at all times. During scanning, line 304 controls the $\overline{\text{ENABLE}}$ line 570. Thus, the output memory 100 is enabled only during the first state of decoder 280. During scanning only the addressed location of output memory unit 100 is read. When there is an input of data or information on line $\overline{\text{DI}}$, a WRITE signal is received in input memory 110 in line 370 from gate 368 at state 12. When this occurs, $\overline{\text{ENABLE}}$ line 570 is at a logic 1 and there is no writing of the data into the output memory from the $\overline{\text{DI}}$ line, even through this data is presented to the output memory unit. The $\overline{\text{DI}}$ line is connected to multiplexing unit 144 at line 590 which is directed to AND gate 260, shown in FIG. 6B. The output 592 of this gate is inverted by inverter 594 to produce the desired logic in line 596. This logic is directed to the 3B terminal of multiplexing circuit 144 to control the logic on $\overline{\text{DATA}}$ line 572 connected to the data input terminals DI of memory units 100, 110.

In operation, without changing conditions, counter 282 cycles state decoder 280 to each address created by address counter 130. At first, line 370 is at a logic 1 which is a READ condition for the output memory 100 and the input memory 110. Thus, the D0 terminals of these memory units contain the addressed single bit information. This information appears in line 580. Gate 310 clocks flip-flop 320 to apply the single bit of information into line $\overline{\text{DO}}$. This logic is then directed to input of an addressed I/O memory unit 146, as shown in FIG. 4. The address is determined by the output of counter 130 through auxiliary lines A0–A7 which are decoded into address lines $\overline{\text{TA0}}$ to $\overline{\text{TA15}}$ and $\overline{\text{BA0}}$ to $\overline{\text{BA3}}$ and which are directed to both the memory units 100, 110. The logic read from output memory 100 remains at the Q output line 582 of flip-flop 320. Thereafter, state decoder 280 shifts to states 5, 6 and 7 in sequence. This produces a logic 1 in line 322 which causes the single bit of data to be written into I/O memory 146 for the addressed output location or unit B. During states 8, 9 and 10, the condition of the addressed location or unit B appears at the $\overline{\text{DI}}$ line 590 of the input of module 70. At state 11, a logic 1 appears in line 344 to determine whether or not a CPU access request has been made. Assuming that CPU line 200 has not shifted to a logic 1, decoder 280 shifts to state 12. At that time, a logic 1 appears in line 214 to assure that the previous condition of multiplexing units 140, 142 and 144 are held irrespective of an access request on line 200. During this holding action, a pulse is created in line 366. This creates a logic 1 at the output of OR gate 368 to shift R/W line 370 to a logic 0. Thus, the memory units 100, 110 are shifted to the WRITE mode. At the same time, $\overline{\text{ENABLE}}$ line 570 is at a logic 1. This disables the output memory 100. The input data at the $\overline{\text{DI}}$ terminal from address unit B is directed through line 596, input terminal 3B of multiplexer circuit 144 to $\overline{\text{DATA}}$ line 572. Thus, the input data is applied to both memory unit 100 and memory unit 110. The data on line 572 is written into only the enabled input memory 110. Decoder 280 shifts to state 13 which creates a logic 1 in line 384. This clocks line 392 directed to the incrementing gate 400. Thus, a logic 1 appears in line 410 to clock counter 130 to the next incremental address at the auxiliary address lines A0–A7. This process is repeated for the next scanning cycle. If an input information has changed during the scanning operation, the new input is written into the input memory. If as addressed external location or unit B is an output unit, the intended logic condition of this unit is first written into the output by the output memory unit 100. Thereafter, the condition is read from unit B and written into input memory unit 110. Thus, by using this concept, it is not necessary to have an actual circuit being controlled by the control line 150.

If unit B is an input, then its logic condition is recorded in input memory unit 110 only. As will be explained later, the CPU writes into both memory units, but reads only input memory unit 110. Thus, changing data input conditions can be read by the CPU by reading the condition of input memory unit 110. To set a different condition for an input, data is multiplexed into both memory units 100, 110. The correspondence between memory units for an output unit B or an empty position at an addressed location has been previously discussed.

To WRITE information from the $\overline{DO}$ line 582 into an addressed unit B, used as an output, an address as shown in FIG. 5 shifts the CPU line 200 to a logic 1. A WRITE pulse at the $\overline{R/W}$ terminal shifts data transfer device 151 to place the required data on line 230. This data is passed by gate 204 to line 231 at the 3A input of multiplexer circuit 144. A logic 1 in CPU line 200 places a logic 0 in line 212 to shift the multiplexing circuits 140, 142, 144 to the A input terminals. Memory units 100, 110 are now addressed by the address from the CPU, as represented in FIG. 5. A logic 0 WRITE pulse occurs in line 370 and a continuous enable signal is retained in line 570. This therefore writes the data from line 572 into both output memory unit 100 and input memory unit 110. Of course, if a state 12 is being processed, there is a delay in shifting the multiplexing units 140, 142 and 144 by gate 210 and line 212. The data is transferred from lihe 231 to line 572 for this WRITE cycle. During this cycle, a logic 1 appears at the output 172 of gate 170. This produces a logic 0 in line 290. Thus, the scanner is shifted to its initial state. Consequently, the scanner has been reset to start scanning during the next address of the CPU which is not a CPU access address. Data has been written into both the output and input memory units. When the address on the address lines of CPU 10 is not an access address for module 70, line 200 shifts back to a logic 0. This again shifts the multiplexing circuits 140, 142 and 144 into the scanning mode. At that time, the new data is transferred to the addressed external output or input location or unit B for updatng that information. If the address position is vacant, the data is stored in the single bit I/O memory 146.

If the access by the CPU is for reading data from an addressed location, the same basic operation takes place; however, the data is read from the input memory 110 at the DO terminal which controls the logic on line 560. This logic is directed to EXCLUSIVE OR gate 566 which selectively inverts to stored data according to the logic on CPU address line $\overline{A13}$. At the same time, line 157 shifts to a logic 0 as previously described. This transfers the data from line 568 to the bi-directional data line $\overline{D_0}$. After the data has been obtained by the CPU, a subsequent address shifts line 200 to a logic 0. This places the circuit shown in FIG. 6 into the scanning mode. Since this was a READ cycle, there is no updating during the scanning cycle. If during the scanning, an input is changed, the new information is written into memory 110 as previously described. Periodically the CPU will READ the various input conditions to identify any change in condition. This can be done at a time spacing greater than a single CPU program cycle.

During system RESET, line 250 shifts to a logic 1 which enables $\phi2$ gate 406. Consequently $\phi2$ pulses are gated by gate 404 to clocking line 410. This increments counter 130 at the $\phi2$ rate instead of at the rate of successive appearances of state 13 in decoder 280. This provides a rapid cycling of counter 130 to zero during RESET.

In practice the I/O memory 146 and selector 148 for a given address may be omitted. In this instance memory units 100, 110 can function as auxiliary, usable memory location. Switches 424 will be connected to avoid scanning of these auxiliary memory locations except during system RESET as previously described. If a unit B is connected at an addressed location and line 50 is disconnected from an input or output, the I/O memory 146 can function as a single bit memory location. In this instance, counter 130 may scan the addressed location of such unit B, or in some instances the addresses may be bypassed by selective loading of counter 130.

Having thus defined the invention, it is claimed:

1. A system for monitoring the logic condition at external addressable locations with known address codes in a programmable controller of the type including a central processing unit, primary address lines connected to the central processing unit, at least one bi-directional data line connected to the central processing unit, a WRITE line connected to the central processing unit for receiving a programmed WRITE signal from said central processing unit and a READ line connected to said central processing unit for receiving a programmed READ signal from said central processing unit, said system comprising: an intermediate output memory unit having a memory location for each external location; an intermediate input memory unit having a memory location for each external location; means for writing data from said line into one of said memory locations of each of said memory units upon creation of a selected one of said known address codes on said primary address lines and a programmed WRITE signal; means for reading data from a memory location in said input memory unit upon creation of a selected one of said known address codes on said primary address lines and a programmed READ signal; sequence counter means for creating said known address codes in sequence on a set of auxiliary address lines, said auxiliary lines being independent of said primary address lines; means for creating a hardwired WRITE signal independent of said programmed WRITE signal and concurrent with a creation of one of said known address codes in said auxiliary address lines; means for creating a hardwired READ signal independent of said programmed READ signal and concurrent with creation of one of said known address codes in said auxiliary address lines; means responsive to one of said hardwired signals for directing data from said output memory unit to the one of said external locations addressed by said one of said created address codes in said auxiliary lines; and means responsive to the other of said hardwired signals for directing data corresponding to the logic condition of a selected one of said external locations from said selected location to said input memory unit for reading and writing to and from said central processing unit.

2. A system as defined in claim 1 wherein said sequence counter means includes a counter having maximum sequence counts and output terminals; means connecting said output terminals to said set of auxiliary address lines, means for causing said counter to count to change the address coding on said output terminals, said codes each corresponding to one of said known address codes.

3. A system as defined in claim 2 having a given number of external logic locations and including means for loading a known number into said counter, said known number being the same as said given number.

4. A system as defined in claim 3 including means for receiving a system reset signal, means responsive to said reset signal for latching said known number to a given number approaching approximately said maximum counts.

5. A system as defined in claim 4 including a sequence decoder having means for creating a series of hardwired signals in sequence, one of said hardwired signals being said hardwired WRITE signal an another of said hardwired signals being said hardwired READ signal.

6. A system as defined in claim 1 including a sequence decoder having means for creating a series of hardwired signals in sequence with one of said hardwired signals being said hardwired WRITE signal and another of said hardwired signals being said hardwired READ signal.

7. A system as defined in claim 6 including means for creating a master reset signal and means for resetting said sequence decoder upon creation of said master reset signal.

8. A system as defined in claim 1 including a multiplex circuit having output address terminals, a first set of address input terminals, a second set of address input terminals and shift means for selectively shifting said multiplexing circuit between a first condition connecting said first set of terminals of said multiplex circuit to said output terminals of said multiplex circuit and a second condition connecting said second set of terminals of said multiplex circuit to said output address terminals of said multiplex circuit; means for connecting said output address terminals to said intermediate output memory unit and to said intermediate input memory unit; means for connecting said primary address lines to said first set of address input terminals; means for connecting said auxiliary lines to said second set of address input terminals; means for shifting said shift means to said first condition during said programmed WRITE signal; and means for shifting said shift means to said first condition during said programmed READ signal.

9. A system as defined in claim 8 wherein said sequence counter means includes a counter with output terminals and having a maximum count and means for creating address codes in sequence at said output terminals of said counter; means connecting said output terminals of said sequence coutner to said auxiliary address lines, means for causing said sequence counter to sequentially direct said created address codes on said output terminals of said sequence counter.

10. A system as defined in claim 8 including a sequence decoder having means for creating a series of hardwired signals in sequence, one of said hardwired signals being said hardwired WRITE signal and another of said hardwired signals being said hardwired READ signal.

11. A system as defined in claim 10 including means for creating a master reset signal and means for resetting said sequence decoder upon creation of said master reset signal.

12. In a programmable controller having external single bit data terminals and a central processing unit for creating addresses in primary address lines connected to said central processing unit, a bidirectional data line connected to said central processing unit for directing data to and from said central processing unit, a WRITE command created in a first control line by said central processing unit, a READ command created in a second control line by said central processing unit, a number of remote single bit data storing units each for controlling a single bit external data terminal and a number of single bit data input units each for inputting a single bit of data from a data terminal, each of said single bit units having address codes, the improvement comprising: an intermediate memory having internal storage locations each corresponding to one of said single bit units and each being addressable by a known address code corresponding to the address code of said single bit units; means for creating one of said known address codes in auxiliary address lines separate from said primary address lines; means independent of said central processing unit for creating a hardwired WRITE signal in a third control line independent of said first control line receiving said WRITE command; means independent of said central processing unit for creating a hardwired READ signal in a fourth control line independent of said second control line receiving said READ command; means for transferring single bit data from one of storage locations of said intermediate memory to one of said single bit data storing ununts in response to one of said created known address codes in said auxiliary address lines and said independent WRITE signal in said third control line; means for transferring single bit data from one of said input units to an addressed one of said memory storage locations in response to one of said address codes in said auxiliary lines and said READ signal in said fourth control line; means for applying selected data onto said data line from one of said memory locations in response to said READ command on said second control line and a selected address code on said primary address lines; and, means for storing data from said data line into a selected one of said memory locations in response to said WRITE command on said first line and a selected address code on said primary address lines.

13. A system as defined in claim 12 wherein said address creating means includes a counter having a maximum count and output terminals; means connecting said output terminals to said set of auxiliary address lines, means for causing said counter to count to change the address coding on said output terminals of said counter and in said auxiliary address lines, said address codes corresponding to said memory locations and said single bit units.

14. In a programmable controller including a central processing unit having a bi-directional data line for directing a single bit of digital data from the central processing unit upon a WRITE command in a first control line connected to said central processing unit and for directing a single bit of digital data to said central processing unit upon a READ command in a second control line connected to said central processing unit, and a series of combined input/output terminals each having first and second conditions controlled by a single bit of binary data, the improvement comprising: a first memory unit having a one bit storage location for each of said input/ output terminals; a second memory unit having a one bit storage locaton for each of said input/output terminals; means responsive to said WRITE command in said first control line for a selected one of said input/output terminals to store a one bit of binary data into the storage location for a selected input/output terminal at least in one of said first and second memory units; a series of single bit memory devices remote to said first and second memory units and connected to each of said input/output terminals for storing one bit of binary data for controlling the condition of said input/output terminals; sequencing means operated independently of said central processing unit for periodically transferring a single bit of binary data from separate storage locations of said one of said first and second memory units to each of said single bit memory devices at said input/output terminals; means responsive to a single bit of binary data in each of said single bit memory devices for selectively shifting said selected input/output locations between said first and said second conditions; means responsive to said sequencing means for transferring a single bit of binary data from selected input/output terminals to a storage location for said selected input/output terminals in the other of said first and second memory units; means responsive to said READ command in said second control line for transferring said single bit of binary data from a selected one of said storage locations of one of said first and second memory units to said central processing unit; and means for continuing said sequencing means until a READ or WRITE command in one of said first or second control lines is created for one of said storage locations in said first and second memory units.

15. In a programmable controller including a central processing unit, an output memory unit for storing binary data at selected storage locations therein; an input memory unit for storing binary data at selected storage locations therein; a series of combined input and output terminals for directing data to and from said controller and each terminal being controlled by a single bit of binary data; a group of address lines individually actuating one of said terminals when said address line is energized; an address line controlled means for selectively connecting each of said input and output terminals with both of said memory units; a sequencing circuit for energizing each of said address lines in said group of address lines in sequence for a selected cycle; a scanning device including first means operable during each of said cylces for directing terminal controlling binary data from the one of said input and output terminals actuated by said energized address line to one of the storage locations of one of said memory units and second means operable by said scanning device during each of said cycles for directing input and output terminal controlling binary data from a storage location from the other of said memory units to the input and output terminal actuated by energized address line; means responsive to said central processing unit for storing binary data for selected ones of said input and output terminals into said storage locations of said memory units; and means responsive to said central processing unit for reading binary data from selected ones of said storage locations of at least one of said memory units.

16. In a programmable controller as defined in claim 15 including a single bit memory device at each of said input and output terminals, each of said memory devices including means for storing said terminal controlling data for one of said input and output terminals, said first means includes means for directing said controlling data from said singel bit memory devices of the terminal actuated by said energized address lines to the storage locations of said one of said memory units, said second means including means for directing binary data from the storage locations of the other of said memory units to said single memory device of said input and output terminals actuated by said energized address line.

17. In a programmable controller having single bit controllable terminals operated as either an input terminal or an output terminal, each of said terminals including a single bit data memory device, means for controlling the conditions of said terminals by the single bit of data in said memory devices, a first multiple bit memory unit including several storage locations for storing single bit data, a second multiple bit memory unit including several locations for storing single bit data, a scanning device including first means for successively transferring single bit data from said first multiple bit memory unit to said single bit memory devices associated with each of said output terminals and second means for successively transferring single bit data from said single bit memory devices to said second multiple bit memory unit; control means separate from said scanning device for selectively changing the single bit data of the storage locations of said first multiple bit memory unit; and, control means separate from said scanning device for selectively reading the single bit data of storage locations of said second multiple bit memory unit.

18. In a programmable controller having a plurality of single bit controllable external terminals, each of said terminals having changeable conditions and including a single bit memory device for storing one bit of binary data, said stored date being indicative of the changeable condition of said terminal and a line means for reading said one bit of condition indicative data for each of said terminals; a sequentially operated multiple bit memory unit for periodically directing selected one bit binary data to said single bit memory devices of said terminals; means for changing said indicative stored data at a given single bit memory device when said selected data directed to said single bit memory device is different from said indicative stored data of said single bit memory device; and means for changing said stored data of said single bit memory devices in response to the conditions of said external terminals.

* * * * *